US011791920B1

(12) United States Patent
Barge

(10) Patent No.: US 11,791,920 B1
(45) Date of Patent: Oct. 17, 2023

(54) RECOMMENDING MEDIA TO LISTENERS BASED ON PATTERNS OF ACTIVITY

(71) Applicant: Amazon Technologies, Inc., Seattle, WA (US)

(72) Inventor: Charlotte Barge, Suwanee, GA (US)

(73) Assignee: Amazon Technologies, Inc., Seattle, WA (US)

( * ) Notice: Subject to any disclaimer, the term of this patent is extended or adjusted under 35 U.S.C. 154(b) by 75 days.

(21) Appl. No.: 17/548,177

(22) Filed: Dec. 10, 2021

(51) Int. Cl.

| | |
|---|---|
| ***H04H 60/33*** | (2008.01) |
| ***H04M 3/00*** | (2006.01) |
| ***H04M 3/51*** | (2006.01) |
| ***H04M 3/493*** | (2006.01) |
| ***H04H 60/31*** | (2008.01) |
| ***H04H 60/87*** | (2008.01) |

(52) U.S. Cl.
CPC ............ *H04H 60/33* (2013.01); *H04H 60/31* (2013.01); *H04H 60/87* (2013.01)

(58) Field of Classification Search
CPC .......... G06N 20/00; G06N 3/006; G06N 5/02; G06N 5/022; G06F 16/90332; G06F 3/167; G06F 9/5072; G06Q 10/0633; G06Q 30/00; G06Q 30/01; G06Q 30/02; G06Q 30/0242; G10L 15/1807; G10L 15/197; G10L 15/22; G10L 2015/226; H04L 41/5054; H04L 41/5064; H04L 67/34; H04M 2203/401; H04M 3/42221; H04M 3/4936; H04M 3/5166; H04M 3/5175; H04M 3/5191; H04M 7/0021; H04M 7/0036
USPC ........................ 455/2.01; 700/94; 725/10, 24
See application file for complete search history.

(56) References Cited

U.S. PATENT DOCUMENTS

| | | | |
|---|---|---|---|
| 8,023,800 | B2 | 9/2011 | Concotelli |
| 8,560,683 | B2 | 10/2013 | Funk et al. |

(Continued)

FOREIGN PATENT DOCUMENTS

| | | | |
|---|---|---|---|
| AU | 2013204532 | B2 | 11/2014 |
| CA | 2977959 | A1 | 9/2016 |

(Continued)

OTHER PUBLICATIONS

Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

(Continued)

*Primary Examiner* — Tan H Trinh
(74) *Attorney, Agent, or Firm* — Athorus, PLLC

(57) ABSTRACT

Where a listener consumes media content that is produced on a recurring or non-recurring basis, such as an episode of a media program, the listener may be prompted to receive notifications when the media content, or similar media content, will be aired again in the future. Additionally, where a listener consumes media content while engaged in one or more actions or movements, the media content consumed by the listener is associated with the actions or movements, or a pattern of such actions or movements. Subsequently, when the listener engages in similar actions or movements, or a pattern of such actions or such movements, media content that is similar to the media content previously consumed by the listener during such actions or such movements is identified and recommended to the listener.

20 Claims, 28 Drawing Sheets

(56) References Cited

U.S. PATENT DOCUMENTS

| | | | |
|---|---|---|---|
| 8,572,243 B2 | 10/2013 | Funk et al. | |
| 8,768,782 B1 | 7/2014 | Myslinski | |
| 8,850,301 B1 | 9/2014 | Rose | |
| 9,003,032 B2 | 4/2015 | Funk et al. | |
| 9,369,740 B1 | 6/2016 | Funk et al. | |
| 9,613,636 B2 | 4/2017 | Gibbon et al. | |
| 9,706,253 B1 | 7/2017 | Funk et al. | |
| 9,729,596 B2 | 8/2017 | Sanghavi et al. | |
| 9,781,491 B2 | 10/2017 | Wilson | |
| 9,872,069 B1 | 1/2018 | Funk et al. | |
| 10,083,169 B1 | 9/2018 | Ghosh et al. | |
| 10,091,547 B2 | 10/2018 | Sheppard et al. | |
| 10,110,952 B1 | 10/2018 | Gupta et al. | |
| 10,135,887 B1 | 11/2018 | Esser et al. | |
| 10,140,364 B1 | 11/2018 | Diamondstein | |
| 10,178,422 B1 | 1/2019 | Panchaksharaiah et al. | |
| 10,178,442 B2 | 1/2019 | Shkedi | |
| 10,313,726 B2 | 6/2019 | Woods et al. | |
| 10,356,476 B2 | 7/2019 | Dharmaji | |
| 10,432,335 B2 | 10/2019 | Bretherton | |
| 10,489,395 B2 | 11/2019 | Lakkur et al. | |
| 10,685,050 B2 | 6/2020 | Krishna et al. | |
| 10,698,906 B2 | 6/2020 | Hargreaves et al. | |
| 10,719,837 B2 | 7/2020 | Kolowich et al. | |
| 10,769,678 B2 | 9/2020 | Li | |
| 10,846,330 B2 | 11/2020 | Shilo | |
| 10,985,853 B2 | 4/2021 | Bretherton | |
| 10,986,064 B2 | 4/2021 | Siegel et al. | |
| 10,997,240 B1 | 5/2021 | Aschner et al. | |
| 11,431,660 B1 | 8/2022 | Leeds et al. | |
| 11,451,863 B1 | 9/2022 | Benjamin et al. | |
| 11,463,772 B1* | 10/2022 | Wanjari | H04N 21/4394 |
| 11,521,179 B1 | 12/2022 | Shetty | |
| 11,580,982 B1* | 2/2023 | Karnawat | G06F 3/0482 |
| 11,586,344 B1* | 2/2023 | Balagurunathan | H04L 65/60 |
| 2002/0042920 A1 | 4/2002 | Thomas et al. | |
| 2002/0056087 A1 | 5/2002 | Berezowski et al. | |
| 2006/0268667 A1 | 11/2006 | Jellison et al. | |
| 2007/0124756 A1 | 5/2007 | Covell et al. | |
| 2007/0271518 A1 | 11/2007 | Tischer et al. | |
| 2007/0271580 A1 | 11/2007 | Tischer et al. | |
| 2008/0086742 A1 | 4/2008 | Aldrey et al. | |
| 2009/0044217 A1 | 2/2009 | Lutterbach et al. | |
| 2009/0076917 A1 | 3/2009 | Jablokov et al. | |
| 2009/0100098 A1 | 4/2009 | Feher et al. | |
| 2009/0254934 A1* | 10/2009 | Grammens | H04H 60/33 725/24 |
| 2010/0088187 A1 | 4/2010 | Courtney et al. | |
| 2010/0280641 A1* | 11/2010 | Harkness | H04H 20/86 700/94 |
| 2011/0063406 A1 | 3/2011 | Albert et al. | |
| 2011/0067044 A1 | 3/2011 | Albo | |
| 2012/0040604 A1 | 2/2012 | Amidon et al. | |
| 2012/0191774 A1 | 7/2012 | Bhaskaran et al. | |
| 2012/0304206 A1 | 11/2012 | Roberts et al. | |
| 2012/0311618 A1 | 12/2012 | Blaxland | |
| 2012/0331168 A1 | 12/2012 | Chen | |
| 2013/0074109 A1 | 3/2013 | Skelton et al. | |
| 2013/0247081 A1 | 9/2013 | Vinson et al. | |
| 2013/0253934 A1 | 9/2013 | Parekh et al. | |
| 2014/0019225 A1 | 1/2014 | Guminy et al. | |
| 2014/0040494 A1 | 2/2014 | Deinhard et al. | |
| 2014/0068432 A1 | 3/2014 | Kucharz et al. | |
| 2014/0073236 A1* | 3/2014 | Iyer | H04H 60/33 455/2.01 |
| 2014/0108531 A1 | 4/2014 | Klau | |
| 2014/0123191 A1 | 5/2014 | Hahn et al. | |
| 2014/0228010 A1 | 8/2014 | Barbulescu et al. | |
| 2014/0325557 A1 | 10/2014 | Evans et al. | |
| 2014/0372179 A1 | 12/2014 | Ju et al. | |
| 2015/0163184 A1 | 6/2015 | Kanter et al. | |
| 2015/0242068 A1 | 8/2015 | Losey et al. | |
| 2015/0248798 A1 | 9/2015 | Howe et al. | |
| 2015/0289021 A1 | 10/2015 | Miles | |
| 2015/0319472 A1 | 11/2015 | Kotecha et al. | |
| 2015/0326922 A1* | 11/2015 | Givon | H04N 21/41407 725/10 |
| 2016/0093289 A1 | 3/2016 | Pollet | |
| 2016/0188728 A1 | 6/2016 | Gill et al. | |
| 2016/0217488 A1 | 7/2016 | Ward et al. | |
| 2016/0266781 A1 | 9/2016 | Dandu et al. | |
| 2016/0293036 A1 | 10/2016 | Niemi et al. | |
| 2016/0330529 A1 | 11/2016 | Byers | |
| 2017/0127136 A1 | 5/2017 | Roberts et al. | |
| 2017/0164357 A1* | 6/2017 | Fan | H04N 21/816 |
| 2017/0213248 A1 | 7/2017 | Jing et al. | |
| 2017/0289617 A1 | 10/2017 | Song et al. | |
| 2017/0329466 A1 | 11/2017 | Krenkler et al. | |
| 2017/0366854 A1 | 12/2017 | Puntambekar et al. | |
| 2018/0025078 A1 | 1/2018 | Quennesson | |
| 2018/0035142 A1 | 2/2018 | Rao et al. | |
| 2018/0205797 A1 | 7/2018 | Faulkner | |
| 2018/0227632 A1 | 8/2018 | Rubin et al. | |
| 2018/0255114 A1 | 9/2018 | Dharmaji | |
| 2018/0293221 A1 | 10/2018 | Finkelstein et al. | |
| 2018/0322411 A1 | 11/2018 | Wang et al. | |
| 2018/0367229 A1* | 12/2018 | Gibson | H04H 60/31 |
| 2019/0065610 A1 | 2/2019 | Singh | |
| 2019/0132636 A1 | 5/2019 | Gupta et al. | |
| 2019/0156196 A1 | 5/2019 | Zoldi et al. | |
| 2019/0171762 A1 | 6/2019 | Luke et al. | |
| 2019/0273570 A1* | 9/2019 | Bretherton | H04H 60/31 |
| 2019/0327103 A1 | 10/2019 | Niekrasz | |
| 2019/0385600 A1 | 12/2019 | Kim | |
| 2020/0021888 A1 | 1/2020 | Brandao et al. | |
| 2020/0160458 A1 | 5/2020 | Bodin et al. | |
| 2020/0226418 A1 | 7/2020 | Dorai-Raj et al. | |
| 2020/0279553 A1 | 9/2020 | McDuff et al. | |
| 2021/0104245 A1 | 4/2021 | Alas et al. | |
| 2021/0105149 A1 | 4/2021 | Roedel et al. | |
| 2021/0125054 A1* | 4/2021 | Banik | H04N 21/4666 |
| 2021/0160588 A1* | 5/2021 | Joseph | H04N 21/2543 |
| 2021/0210102 A1 | 7/2021 | Huh et al. | |
| 2021/0217413 A1 | 7/2021 | Tushinskiy et al. | |
| 2021/0232577 A1 | 7/2021 | Ogawa et al. | |
| 2021/0256086 A1 | 8/2021 | Askarian et al. | |
| 2021/0281925 A1 | 9/2021 | Shaikh et al. | |
| 2021/0366462 A1 | 11/2021 | Yang et al. | |
| 2022/0038783 A1 | 2/2022 | Wee | |
| 2022/0038790 A1 | 2/2022 | Duan et al. | |
| 2022/0159377 A1* | 5/2022 | Wilberding | H04R 27/00 |
| 2022/0223286 A1 | 7/2022 | Lach et al. | |
| 2022/0230632 A1 | 7/2022 | Maitra et al. | |
| 2022/0254348 A1 | 8/2022 | Tay et al. | |
| 2022/0369034 A1 | 11/2022 | Kumar et al. | |
| 2022/0417297 A1 | 12/2022 | Daga et al. | |
| 2023/0217195 A1 | 7/2023 | Poltorak | |

FOREIGN PATENT DOCUMENTS

| | | |
|---|---|---|
| CN | 104813305 A | 7/2015 |
| KR | 20170079496 A | 7/2017 |
| WO | 2019089028 A1 | 5/2019 |

OTHER PUBLICATIONS

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.xml.

(56) References Cited

OTHER PUBLICATIONS

Hoegen, Rens, et al. "An End-to-End Conversational Style Matching Agent." Proceedings of the 19th ACM International Conference on Intelligent Virtual Agents. 2019, pp. 1-8. (Year: 2019).

* cited by examiner

FIG. 5C
582
530-2
585
FEB 4 - 3:30pm
BRASS BONANZA
536
Thank you for enjoying today's episode! This show airs every Tuesday at 3 o'clock p.m. Would you like to automatically connect and listen to the next episode?
538-1
538-2
YES!
NO THANKS
580

RECOMMENDING MEDIA TO LISTENERS BASED ON PATTERNS OF ACTIVITY

BACKGROUND

Human beings are creatures of habit. Many humans generally perform activities throughout their daily lives in patterns, and often do the same things in the same situations on a regular basis, such as daily, weekly, monthly or at intervals of any other duration. Some researchers have described habits as including three fundamental parts; cues, routines and rewards. A cue is sometimes described as a trigger that instructs or prompts a brain to prepare itself to operate or function in a learned mode, or to execute familiar actions or activities, seemingly automatically. A routine is a pattern of the familiar actions or activities, which may be executed in a regularly defined sequence, e.g., in series or in parallel. A reward, or harmony, is an affective outcome, or a benefit, that follows the performance of a routine, and effectively maintains the habit in force by encouraging a human to perform the routine again in response to the cue.

Today, many media programs are broadcast “live” to viewers or listeners over the air, e.g., on radio or television, or streamed or otherwise transmitted to the viewers or listeners over one or more computer networks which may include the Internet in whole or in part. Episodes of such media programs may include music, comedy, “talk” radio, interviews or any other content. Alternatively, media programs may be presented to viewers or listeners in a pre-recorded format or “on demand,” thereby permitting such other viewers or listeners to receive a condensed viewing or listening experience of the media program, after the media program was already aired and recorded at least once.

Many people tend to enjoy listening to or viewing media programs while or after doing other things. Components for presenting media to such consumers, e.g., in audible or visible formats, are now included in an ever-growing number of systems such as automobiles, desktop computers, laptop computers, media players, smartphones, smart speakers, tablet computers, televisions, wristwatches, or other like machines.

DETAILED DESCRIPTION

As is set forth in greater detail below, the present disclosure is directed to systems and methods for recommending media to listeners based on patterns of their activities. More specifically, in some implementations, a listener who listens to media, e.g., an episode of a media program or other media generated by a creator, may indicate a preference for media of the same type or kind, such as another episode of the media program, or additional media generated by the creator. Subsequently, when another episode of the media program or any other media that is similar to the media previously listened to by the listener is being aired, has been aired, or otherwise becomes available, one or more notifications may be automatically provided to a device of the listener, or the other media may be automatically transmitted to the device of the listener, e.g., over one or more networks, and made available for consumption by the listener.

Additionally, a listener's preference for media may be expressly stated by the listener or inferred from actions or movements performed by the listener prior to or while consuming the media. For example, where a listener listens to media while engaged in one or more activities or patterns of activities, other media that is of the same type or kind, or is similar to or consistent with that media, may be recommended to the listener when it is determined or predicted that the listener is engaged in the same activities or patterns of activities, or in similar activities or patterns of activities.

Figure 1A:
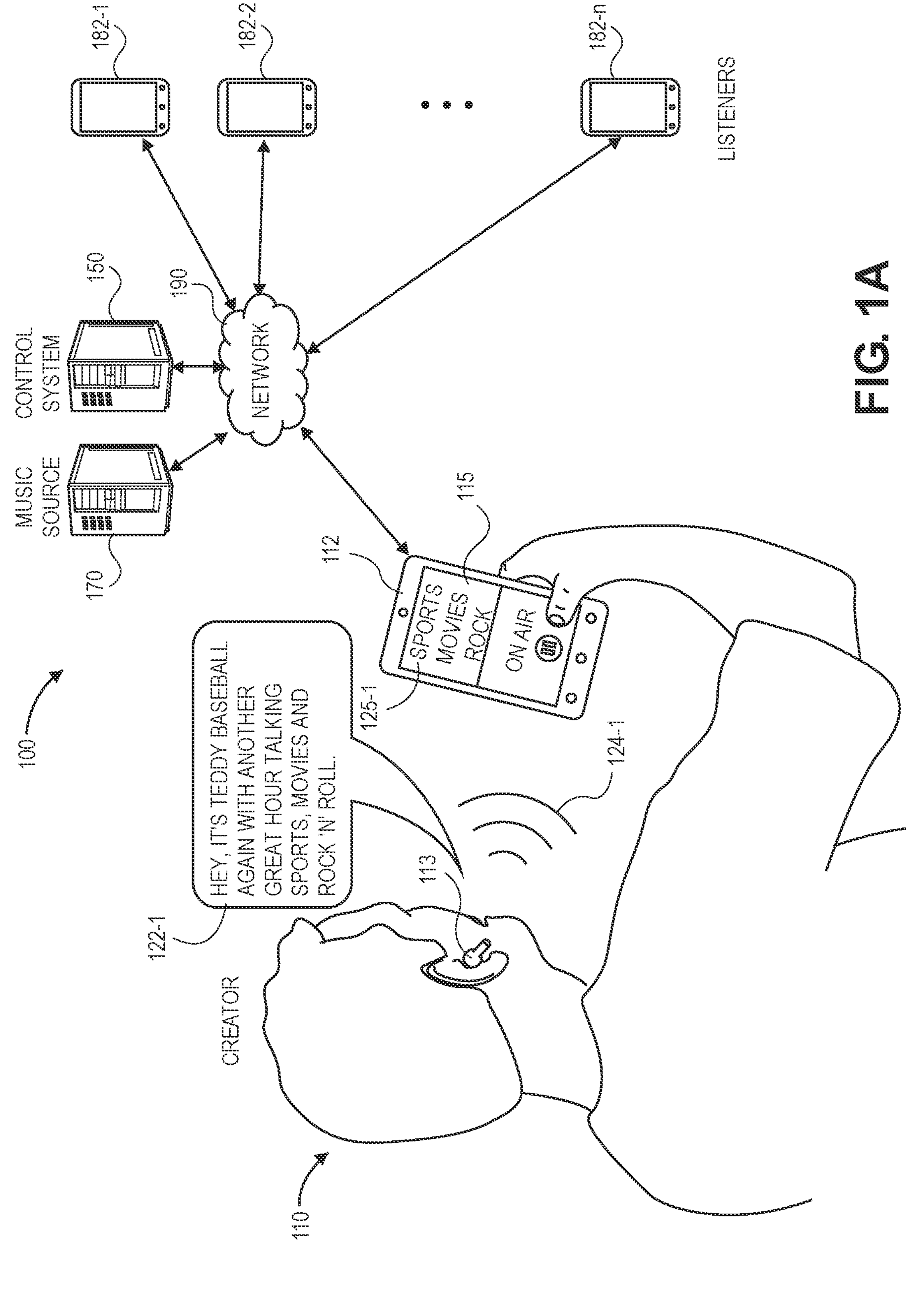
FIGS. 1A through 1G are views of aspects of one system for recommending media in accordance with embodiments of the present disclosure.

Referring to FIGS. 1A through 1G, views of aspects of one system for recommending media in accordance with embodiments of the present disclosure are shown. As is shown in FIG. 1A, a system 100 includes a mobile device 112 (e.g., a smartphone, a tablet computer, a laptop computer, or any other system or device) of a creator 110 (e.g., a user, or a host), a control system 150 (e.g., one or more servers or other computer systems), a music source 170 (e.g., a catalog, a repository, a streaming service, or another source of songs, podcasts or other media entities) and a plurality of computer devices 182-1, 182-2 . . . **182-*n* or other systems of any number of listeners (or viewers) that are connected to one another over one or more networks 190, which may include the Internet in whole or in part. The creator 110 wears one or more ear buds 113 (or ear phones, or head phones) or other communication systems or devices which may be in communication with the mobile device 112, and may exchange (e.g., transfer or receive) data relating to audio signals or any other data with the mobile device 112. As is also shown in FIG. 1A, each of the computer devices 182-1, 182-2 . . . 182-*n* is a mobile device (e.g., a tablet computer, a smart phone, or another like device). Alternatively, the system 100 may include any other type or form of computer devices, e.g., automobiles, desktop computers, laptop computers, media player, smart speakers, televisions, wristwatches, or others. The computer devices that may be operated or utilized in accordance with the present disclosure are not limited by any of the devices or systems shown in FIG. 1A. In some implementations, the control system 150 may establish a two-way or bidirectional channel or connection with the mobile device 112, and one-way or unidirectional channels or connections with each of the devices 182-1, 182-2 . . . 182**-*n* and the music source 170. In some other implementations, the control system 150 may establish two-way or bidirectional channels with the mobile device 112, and any number of the devices 182-1, 182-2 . . . 182-*n*.

As is shown in FIG. 1A, the mobile device 112 includes a display 115 (e.g., a touchscreen) having a user interface 125-1 rendered thereon. The user interface 125-1 may include one or more interactive or selectable elements or features that enable the creator 110 to construct a media program, viz., "Sports, Movies, Rock," from one or more sets of media content, or to control the transmission or receipt of media content in accordance with the media program, e.g., by the control system 150 or from any other source to the computer devices 182-1, 182-2 . . . 182-*n* over the networks 190.

In some implementations, the display 115 may be a capacitive touchscreen, a resistive touchscreen, or any other system for receiving interactions by the creator 110. Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112, the ear buds 113, or any other systems (not shown). In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features that are configured to display information to the creator 110 or to receive interactions from the creator 110 via the display 115.

As is further shown in FIG. 1A, the creator 110 provides an utterance 122-1 of one or more words that are intended to be heard by one or more listeners using the computer devices 182-1, 182-2 . . . 182-*n*. In particular, the creator 110 uses the utterance 122-1 to state his or her location, and to describe an episode of the media program, viz., "Hey, it's Teddy Baseball again with another great hour talking sports, movies and rock 'n' roll." The mobile device 112 and/or the ear buds 113 may capture audio data 124-1 representing the utterance 122-1 of the creator 110, and transmit the audio data 124-1 to the control system 150 over the one or more networks 190. The control system 150 may then cause data, e.g., some or all of the audio data 124-1, to be transmitted to one or more computer systems or devices of listeners over one or more networks 190, including but not limited to the computer devices 182-1, 182-2 . . . 182-*n*.

In some implementations, the user interfaces of the present disclosure (viz., the user interface 125-1, or others) may include one or more features enabling the creator 110 to exercise control over the media content being played by the devices 182-1, 182-2 . . . 182-*n* of the listeners. For example, such features may enable the creator 110 to manipulate a volume or another attribute or parameter (e.g., treble, bass, or others) of audio signals represented in data transmitted to the respective devices 182-1, 182-2 . . . 182-*n* of the listeners by one or more gestures or other interactions with a user interface rendered on the mobile device 112. In response to instructions received from the mobile device 112 by such gestures or interactions, the control system 150 may modify the data transmitted to the respective devices 182-1, 182-2 . . . 182-*n* of the listeners accordingly.

Alternatively, or additionally, the user interfaces of the present disclosure may include one or more elements or features for playing, pausing, stopping, rewinding or fast-forwarding media content to be represented in data transmitted to the respective devices 182-1, 182-2 . . . 182-*n*. For example, the user interfaces may further include one or more elements or features for initiating a playing of any type or form of media content from any source, and the control system 150 may establish or terminate channels or connections with such sources, as necessary, or modify data transmitted to the respective devices 182-1, 182-2 . . . 182-*n* of the listeners to adjust audio signals played by such devices, in response to gestures or other interactions with such elements or features. The user interfaces may further include any visual cues such as "on the air!" or other indicators as to media content that is currently being played, and from which source, as well as one or more clocks, timers or other representations of durations for which media content has been played, times remaining until the playing of media content is expected to end or be terminated, or times at which other media content is to be played.

Figure 1B:
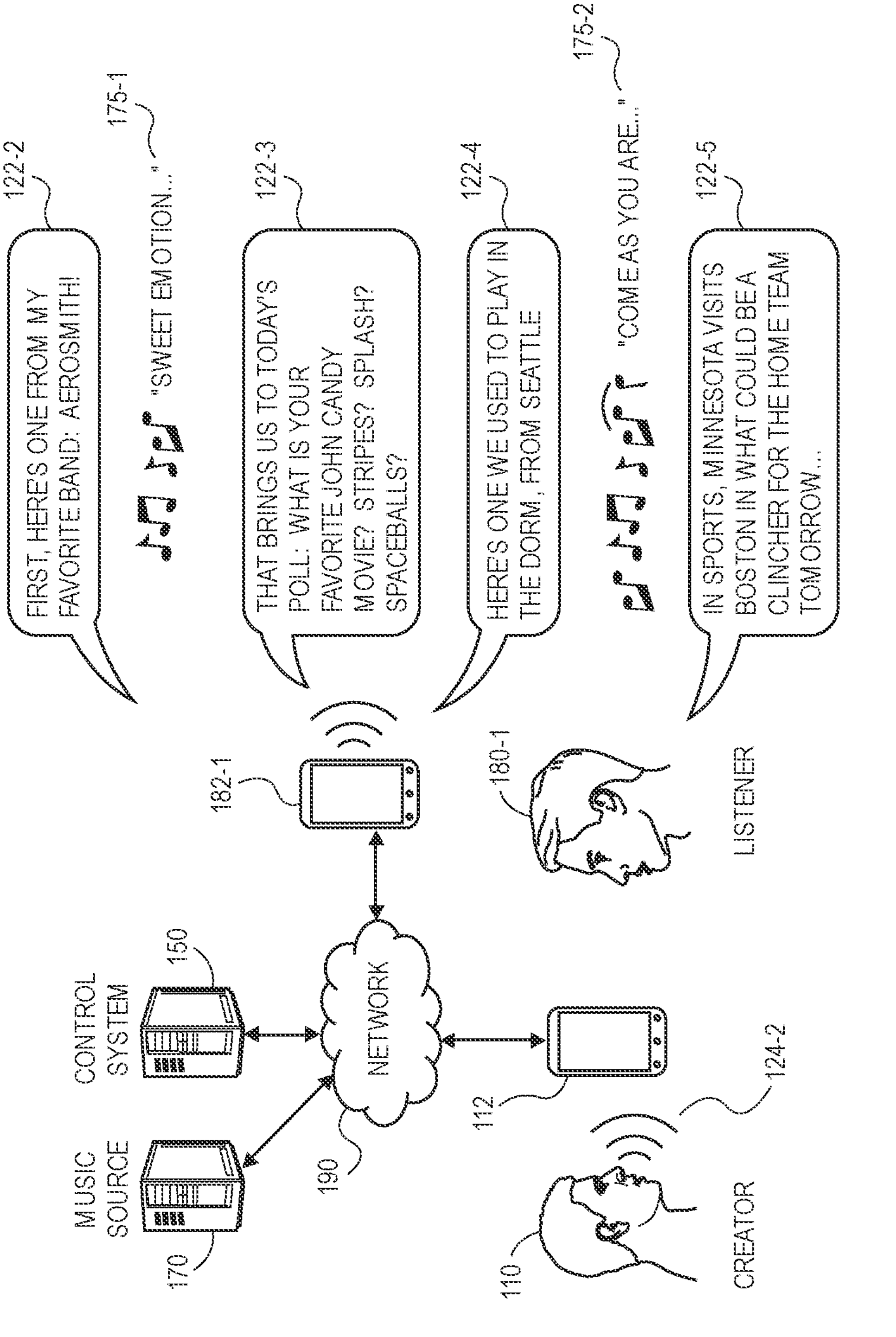

As is shown in FIG. 1B, the creator 110 generates media content during the episode of the media program, and causes the media content to be transmitted to the devices 182-1, 182-2 . . . 182-*n* of the listeners for playing thereon. For example, as is shown in FIG. 1B, the control system 150 receives audio data 124-2 captured by the mobile device 112 representing a plurality of utterances 122-2, 122-3, 122-4, 122-5 of the creator 110, and retrieves audio data 175-1, 175-2 representing a plurality of media entities (e.g., songs, podcasts or other media) from the music source 170, and transmits the audio data 124-2 and the audio data 175-1, 175-2 to at least a device 182-1 of a listener 180-1 to the episode of the media program.

In particular, and in accordance with the episode of the media program, the creator 110 provides the utterance 122-2, viz., "first, here's one from my favorite band: Aerosmith!" and then causes the audio data 175-1 representing a song, viz., "Sweet Emotion," to be transmitted to the devices 182-1, 182-2 . . . 182-*n*. The creator 110 then follows with a pair of utterances 122-3, 122-4, including the utterance 122-3, "that brings us to today's poll: what is your favorite John Candy movie? Stripes? Splash? Spaceballs?" and the utterance 122-4, "here's one we used to play in the dorm, from Seattle." The creator 110 causes the audio data 175-2 representing another song, viz., "Come As You Are," to be transmitted to the devices 182-1, 182-2 . . . 182-*n*, and follows with an utterance 122-5, "in sports, Minnesota visits Boston in what could be a clincher for the home team tomorrow."

Figure 1C:
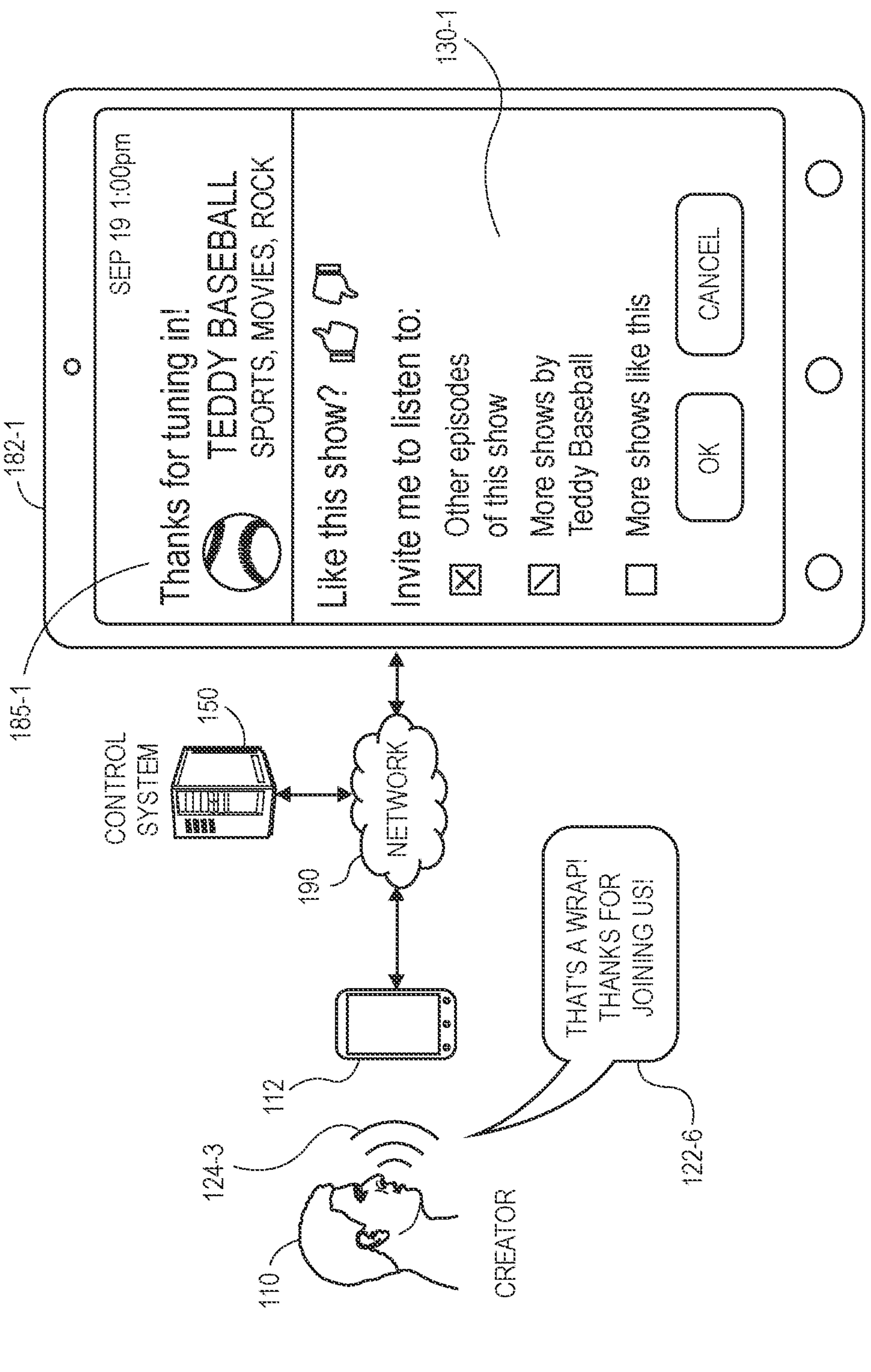

As is shown in FIG. 1C, the creator 110 marks a conclusion of the episode with another utterance 122-6, viz., "that's a wrap! Thanks for joining us!" and the control system 150 causes audio data 124-3 captured by the mobile device 112 and representing the utterance 122-6 to be transmitted to at least the device 182-1 of the listener 180-1. Additionally, a user interface 130-1 including information regarding the episode of the media program is rendered on a display 185-1 of the device 182-1. The user interface 130-1 includes a day and a time at which the media program was aired, along with a greeting and an identifier of the creator 110 of the media program. The user interface 130-1 further includes selectable features, e.g., icons or buttons representing a "thumbs up" or a positive opinion and a "thumb down" or a negative opinion, which may be selected by the listener 180-1 to indicate his or her pleasure or satisfaction, or displeasure or dissatisfaction, with the episode of the media program. The user interface 130-1 also includes selectable features, e.g., check boxes, by which the listener 180-1 may request to receive invitations to listen to other episodes of the media program that the listener 180-1 just completed, invitations to listen to other media programs that are offered by the creator 110, or invitations to listen to other media programs that are similar to the episode or the media program that the listener 180-1 just completed. The listener 180-1 may indicate his or her preferences by executing one or more gestures or other interactions with the display 185-1, and information or data regarding such preferences may be transmitted by the device 182-1 to the control system 150. For example, as is shown in FIG. 1C, the listener 180-1 has requested to receive notifications of other episodes in the media program that the listener 180-1 just completed. Alternatively, in some implementations, the user interface 130-1 may include one or more interactive features enabling the listener 110 to request that such other episodes be directly transmitted to the device 182-1 once such other episodes become available.

Figure 1D:
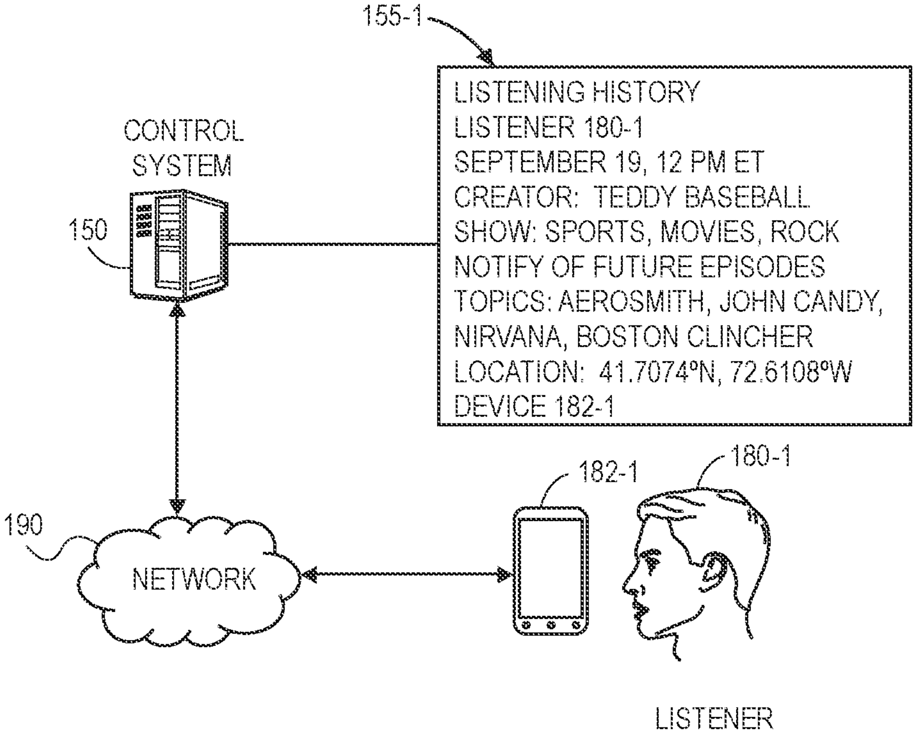

As is shown in FIG. 1D, a record 155-1 of a listening history of the listener 180-1 is stored by the control system 150 or any other computer device or system, e.g., in a "cloud"-based environment. The record 155-1 identifies the listener 180-1 and the media program, and includes information or data regarding the episode of the media program that the listener 180-1 completed, e.g., a day and a time when the listener 180-1 listened to the episode or, alternatively, a number or another identifier of the episode. The record 155-1 also indicates that the listener 180-1 has requested to receive notifications of future episodes of the media program.

The record 155-1 further identifies the creator 110, as well as topics of the episode, viz., the band Aerosmith, the actor John Candy, the band Nirvana, and an upcoming clincher involving a Boston sports team. The record 155-1 also identifies a location at which the listener 180-1 listened to the episode of the media program on the device 182-1 The location at which the listener 180-1 listened to the episode on the device 182-1 may be determined in any manner, such as based on position signals received by any position sensors (e.g., Global Positioning System, or "GPS," receiver) provided on the device 182-1, or any other signals (e.g., cellular telephone signals, network communication signals, or others) received by the device 182-1, or any other manner.

Alternatively, the record 155-1 may include any other information or data regarding the episode of the media program or the creator 110, any of which may be stored in association with the listener 180-1. For example, the record 155-1 may identify any media entities (viz., the songs shown in FIG. 1B) played during the episode, any guests or participants in the episode other than the creator 110, or any genres, subjects, themes or topics of the episode. Likewise, where applicable, the record 155-1 may further include any information or data regarding any other episodes of the media program or of other media programs listened to by the listener 180-1. Although FIG. 1D shows only a single record 155-1 for the listener 180-1, any number of records of information or data regarding any episodes of any media programs listened to by any number of other listeners may be stored by or on the control system 150. Moreover, such records may further describe, identify or relate to any other media (e.g., media entities) preferred by or listened to by such listeners, other than episodes of media programs.

In some implementations of the present disclosure, when information or data regarding an episode of a media program, or any other media, is made available by a creator of the media program or from any other source, the information or data may be compared to listening histories of listeners to determine whether any of such listeners requested to receive the episode of the media program, or a notification or invitation to receive the episode of the media program. The information or data may also be used to determine whether the episode of the media program would be an appropriate fit for such listeners, based on their expressed or implied preferences, or any other information or data regarding interests of such listeners, including but not limited to patterns of activity of such listeners.

Figure 1E:
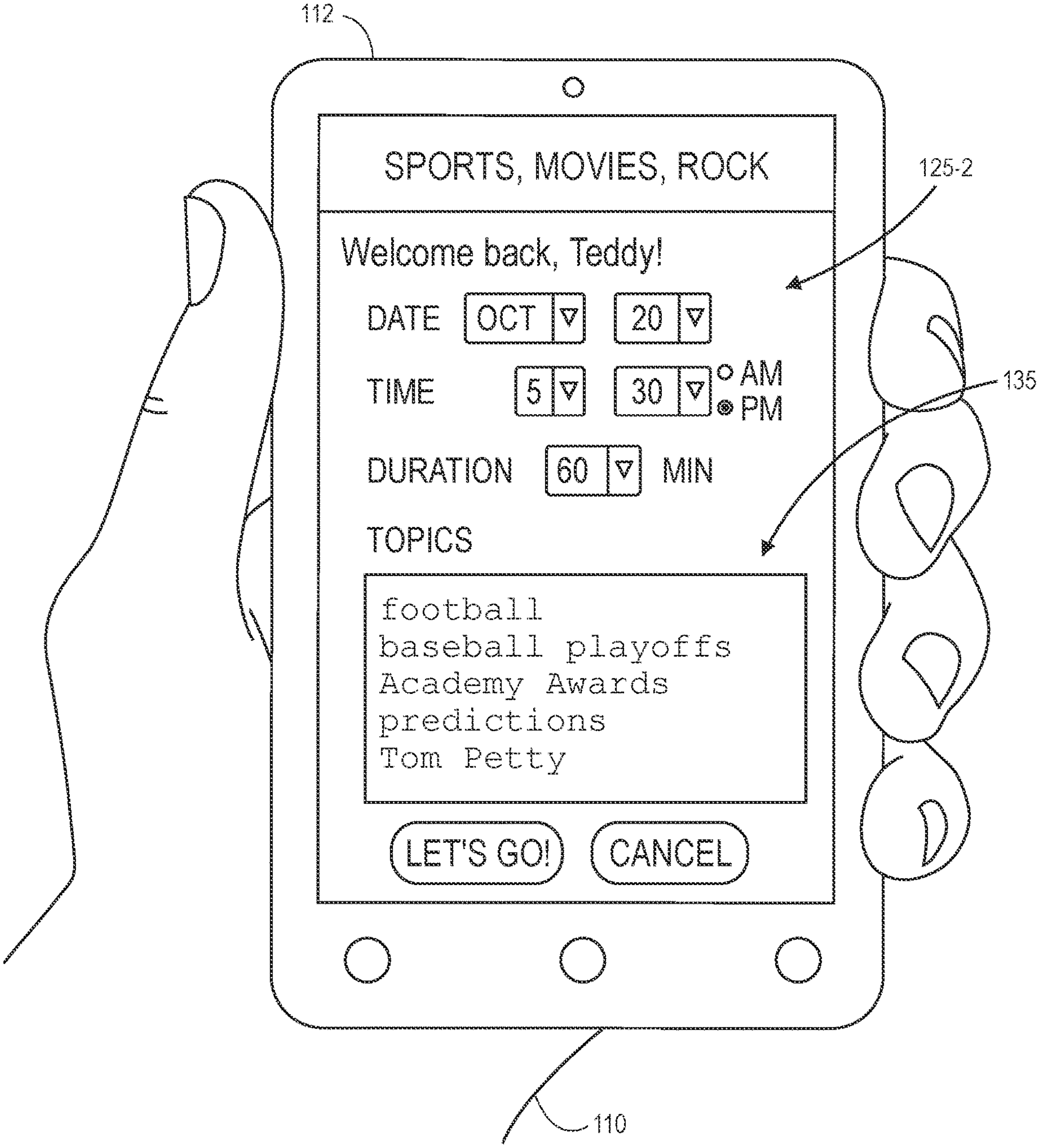

As is shown in FIG. 1E, the creator 110 enters information 135 (or data) regarding an upcoming episode of the media program by one or more gestures or other interactions with a user interface 125-2 rendered by the mobile device 112. For example, as is shown in FIG. 1E, the information 135 entered by the creator 110 includes a date and a time at which the upcoming episode of the media program will air, and a duration of the upcoming episode. The information 135 entered by the creator 110 also identifies one or more topics to be discussed during the episode, viz., football, baseball playoffs, Academy Awards predictions, and the artist Tom Petty. The creator 110 may enter information or data by one or more interactions with the display 115, with a virtual keyboard (not shown), or with any other I/O device, such as by one or more voice commands, or in any other manner.

Figure 1F:
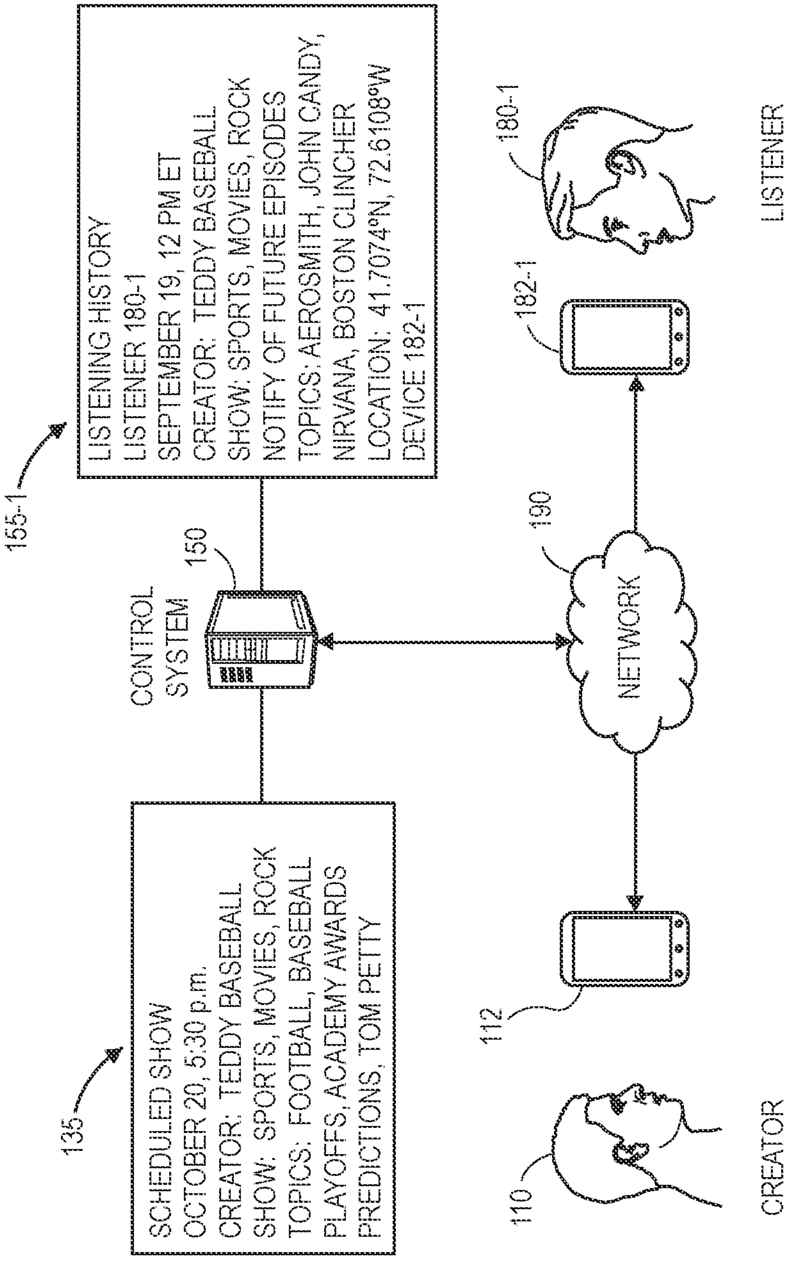

As is shown in FIG. 1F, the information 135 provided by the creator 110 is transmitted by the mobile device 112 to the control system 150 and stored thereon. The information 135 may then be compared to records of listening histories of any number of listeners, e.g., the record 155-1, to determine whether the information 135 is consistent with any requests or instructions received from such listeners, or whether the information 135 indicates that the upcoming episode of the media program would be a good fit for any of such listeners, such as where one or more attributes of the upcoming episode of the media program are consistent with one or more attributes of media that was previously listened to by such listeners, or media that is believed to be of interest to such listeners.

Alternatively, the information 135 may have been received from any other creator, or from any other source, and may relate to any other media. Although FIG. 1F shows only a single set of information 135 received from a single creator 110 regarding a single upcoming episode of a single media program, any number of sets of information or data regarding any other episodes of media programs to be aired by any number of creators, or any other media, may be transmitted to the control system 150 and processed to determine whether any of the sets of information are consistent with any requests or instructions received from listeners, or whether any of the sets of information indicates that such media would be a good fit for any of such listeners.

Figure 1G:
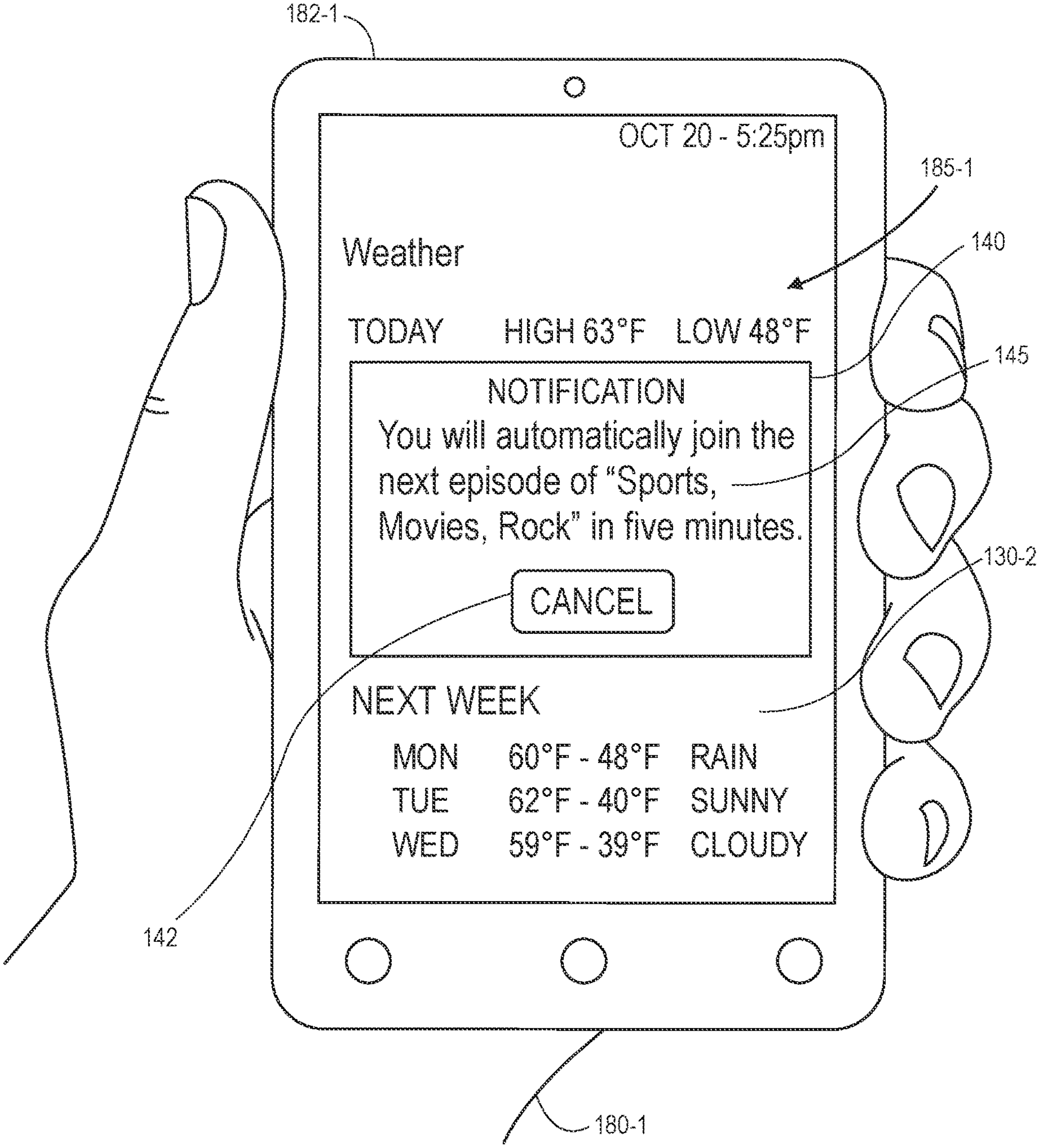

As is shown in FIG. 1G, upon determining that the information 135 regarding the upcoming episode of the media program is consistent with the prior request of the listener 180-1 for a notification as shown in FIG. 1C, or with any interests of the listener 180-1 stored in the record 155-1 as shown in FIG. 1D, the control system 150 transmits information for causing a display of a window 140 or another user interface rendered on the display 185-1 of the device 182-1 of the listener 180-1. For example, the window 140 may include a notification 145 or other information regarding the upcoming episode of the media program, along with a statement that the upcoming episode will be automatically transmitted to the mobile device 182-1 within a predetermined period of time, viz., five minutes. The window 140 also includes a button 142 or another selectable feature that the listener 180-1 may select to decline to receive the episode of the media program. The window 140 may be shown or rendered over a user interface 130-2 rendered on the display 185-1, or displayed by the device 182-1 in any other manner. For example, the notification may be provided to the listener 180-1 by way of an electronic message, such as an E-mail or an SMS or MMS text message, or in any other manner. Alternatively, or additionally, the control system 150 may automatically establish a one-way connection with the device 182-1, and begin transmitting audio data representing the episode to the device 182-1 automatically, regardless of whether the window 140 including the notification has been displayed by the device 182-1.

Accordingly, in some implementations, a listener may indicate his or her interest in media, e.g., an episode of a media program, or any other media, in any manner, such as explicitly by one or more gestures or other interactions with a user interface rendered on a display, implicitly based on a pattern of activities of the listener, or in any other manner. The indications of the listener's interest in media determined either explicitly or implicitly may be stored in association with information regarding the listener. When other media is identified as being an appropriate fit for the listener, or otherwise becomes available for consumption by the listener, such as on a recurring (e.g., scheduled) or non-recurring (e.g., unscheduled) basis, one or more notifications may be provided to a device of the listener, and the listener may be invited to begin receiving the other media via the device. Alternatively, in some implementations, a communications channel may be automatically established between a control system associated with the other media, and the device of the listener, and the other media may be automatically transmitted to the device of the listener as soon as the other media becomes available or the other media is identified as an appropriate fit for the listener, or as soon as the listener approves or requests to receive the other media.

Additionally, in some other implementations, activities of a listener, or patterns of activity by the listener, may be determined by capturing, gathering and/or identifying information or data regarding actions executed by the listener, or movements of the listener, and identifying media consumed (e.g., listened to) by the listener during such actions or movements, and associating such actions or movements with the media consumed by the listener.

Some actions or movements that may be detected and considered by the systems and methods disclosed herein when identifying an activity of a listener, or a pattern of activities by the listener, include but are not limited to physical movements of a listener and/or a computing device or system by which the listener listens to media, such as velocities, accelerations, rotations, orientations or configurations. Some other actions or movements that may be detected and considered by the systems and methods disclosed herein include, but are not limited to, interactions with any applications operating on a computing device or system of a listener, or functions executed or calculations performed by such applications.

Information or data regarding actions or movements of listeners may be captured by devices or systems of listeners in any number of ways, and summarized into one or more representative qualitative or quantitative metrics, e.g., a vector, and associated with media consumed by the listeners. In some implementations, information or data regarding a listener's actions or movements may be identified using a computing device or system for playing media thereon, e.g., a mobile device, such as a smartphone, a tablet computer, or others, that includes one or more hardware components or software applications for tracking a position, an orientation or a configuration of the computing device. Where a computing device or system includes a GPS receiver, an accelerometer or a gyroscope, data captured or received by such components may be used to determine a position, a velocity, an acceleration or an orientation of the computing device or system, which may be used to determine or predict the listener's actions or movements. Data captured or received by such components may be processed using one or more client-side components or applications, e.g., those components or applications residing on the computing device or system by which the listener listens to media, or one or more server-side components or applications, e.g., those components or applications residing on a remote machine, such as a control system, or any other computer device or system.

When information or data regarding a listener's actions or movements have been identified and captured, such information or data may be summarized into a qualitative or quantitative metric, or a vector having any number of variables that may be utilized to represent the listener's actions or movements. The metric or vector may be calculated according to one or more algorithms or formulas, and may be based on all of the available information or data regarding the listener's actions or movements, or on a set or matrix (e.g., a real or complex matrix) of such information or data according to one or more modeling algorithms or methods, such as a singular value decomposition or K-means clustering technique.

Once such a metric or vector has been generated based on information or data captured by or received from a device of a listener, the metric or vector may be used to identify or predict the listener's actions or movements, which may then be represented by the metric or vector in a multivariable numeric fashion and associated with the listener, along with any information or data regarding media being consumed by the listener prior to or during such actions or movements. For example, where a listener executes a series of movements in connection prior to making a request for media by way of a computer device, or while listening to the media, the series of movements may be captured and recorded using one or more sensors provided on the computer device, and a metric or vector representative of the listener's movements may be generated and associated with the media, or with a type or form of media, e.g., an episode of a media program, or a genre, a subject, a theme, a title or a topic of the media. Likewise, where a listener is determined to travel to or from a certain location or at a particular velocity (i.e., a speed and a direction) prior to or while listening to media, the listener's movements to or from the location or at the velocity may be associated with the media accordingly.

When a set of actions or movements (or a scalar or vector representative of such movements) is identified and associated with a listener, the correlation of such actions or movements (or scalars or vectors) to media may be determined and stored in a data store. The aggregated sets of actions or movements, or scalars or vectors representative thereof, may thus form part of a training set of data that may be used to train or refine a model (e.g., a machine learning algorithm, system or technique, such as an artificial neural network) for identifying actions or movements, or associating such actions or movements with media consumed prior to or during such actions or movements. Subsequently, using the model, future actions or movements performed by the listener, or by other listeners, may be summarized or compared to such actions or movements (or such scalars or vectors) in order to identify media for the listener or listeners who performed such actions or movements. For example, where a computing device senses actions or movements made by a listener, and generates a vector based on such actions or movements according to a formula or algorithm, the vector may be compared to other vectors that were also derived according to the formula or algorithm based on other movements or sets of actions or movements (e.g., fishing, operating a mouse or driving a race car). If a generated vector corresponds to one or more previously derived vectors, then the sensed actions or movements may be identified as consistent with the movements on which the one or more previously derived vectors was based.

For example, humans generally walk or run in a pattern based on the simultaneous gait oscillation of eight major joints (including knees, hips, elbows and shoulders). Where one or more scalars or vectors of movement data that are consistent with walking or running are derived according to a formula or algorithm (e.g., in an offline or online process, in real time or near-real time), the systems of the present disclosure may sense oscillating movements made by a listener at a moderate or fast pace, and generate a scalar or a vector based on such movements according to the formula or algorithm. The scalar or vector may be compared to other scalars or vectors (e.g., those previously identified as corresponding to walking or running), and actions or movements of a listener may thus be defined as corresponding to walking or running.

The systems and methods of the present disclosure may utilize a set of data regarding listener actions or movements to identify one or more recommendations of media for a listener in any number of ways. For example, where a listener is observed to have performed one or more actions or movements in connection with listening to media, such as an episode of a media program, or media of any other type or form, the listener's subsequent performance of the same actions or movements, or of similar actions or movements, may indicate an interest in the same media, or in similar media, which may be of the same type or form as the media previously listened to by the listener, or of a different type of form, and such media may be recommended to the listener. Similarly, where a first listener is observed to have performed one or more actions or movements in connection with listening to media, and a second listener is subsequently observed as performing the same or similar actions or movements, then the media listened to by the first listener, or similar media, may be recommended to the second listener.

As used herein, the term "media entity" may refer to media content of any type or form (e.g., audio and/or video) that may be recorded, stored, maintained or transmitted in one or more files, such as a movie, podcast, a song (or title), a television show, or any other audio and/or video programs. The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

Media content that may be included in a media program includes, but need not be limited to, one or more media entities retrieved from a music catalog, repository or streaming service, one or more advertisements of items, goods or services, or one or more news, sports or weather programs, which may be generated live or previously recorded. Media content that may be included in a media program also includes audio data representing words that are spoken or sung by a creator or one or more guests, such as musicians, celebrities, personalities, athletes, politicians, or artists, or any listeners to the media program. A control system, or any associated conference systems, broadcast systems or mixing systems, may establish or terminate connections with a creator, with any sources of media content, or with any number of listeners, to compile and efficiently transmit media content of a media program over digital channels (e.g., web-based or application-based), to any number of systems or devices of any form.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called Web Socket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific media entity, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
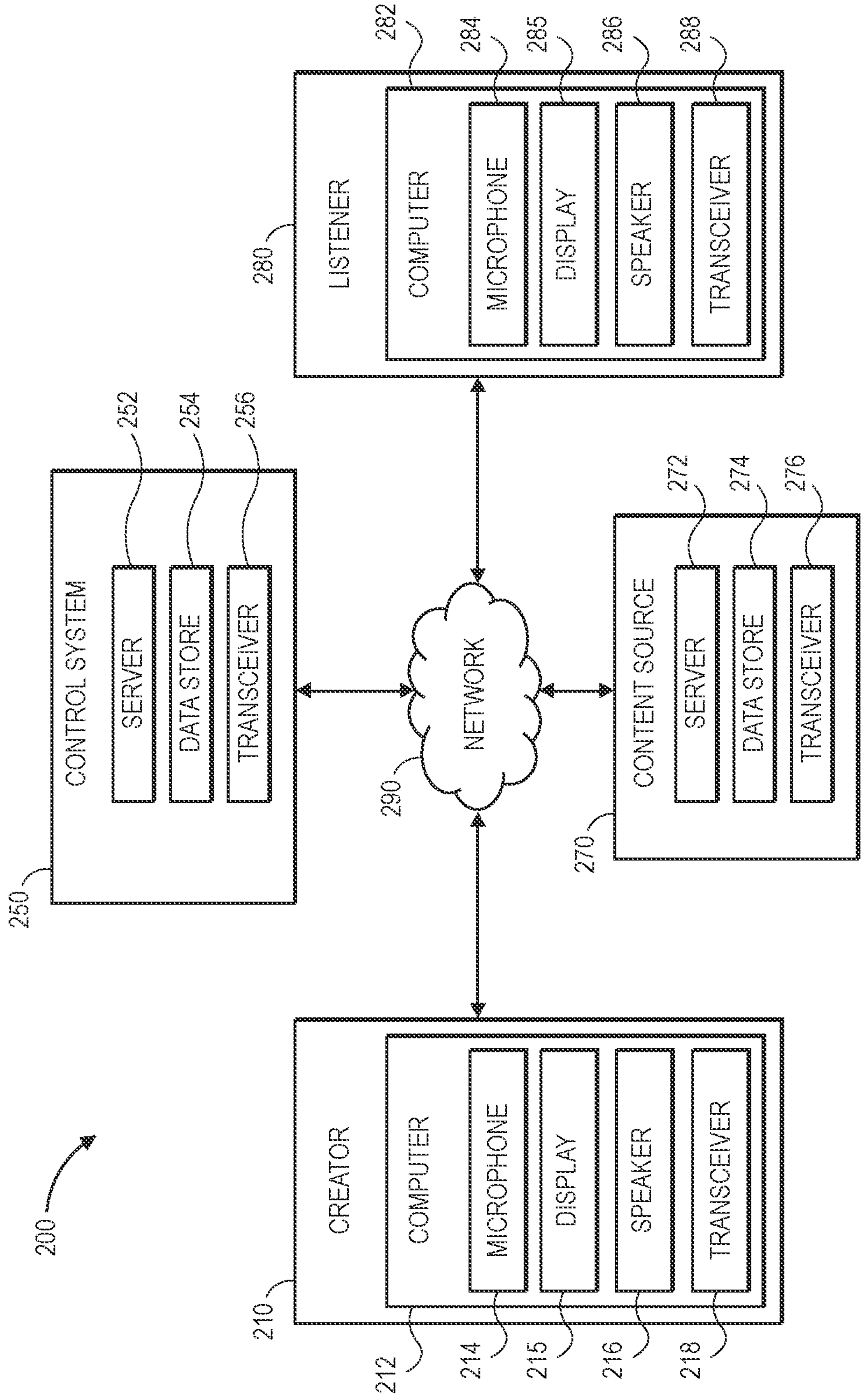
FIGS. 2A and 2B are block diagrams of components of one system for recommending media in accordance with embodiments of the present disclosure.
Figure 2B:
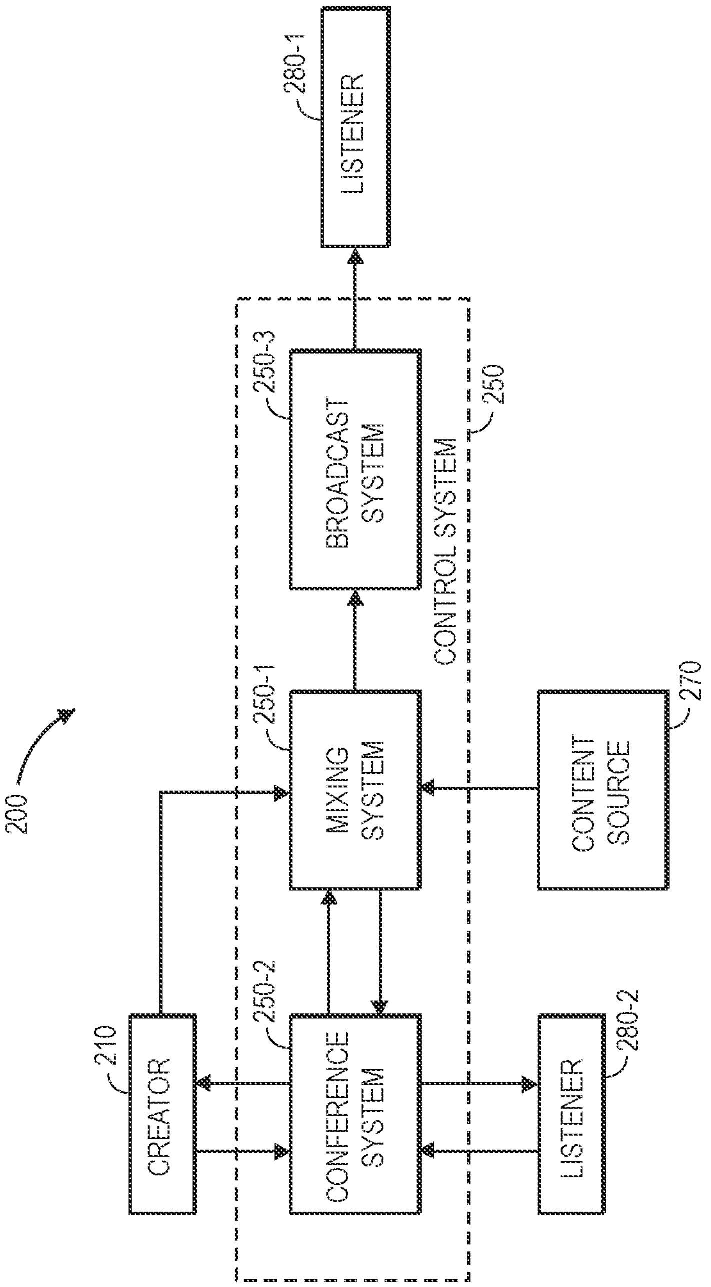

Referring to FIGS. 2A and 2B, block diagrams of components of one system 200 for recommending media in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1G.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source

270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems.

For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributes or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
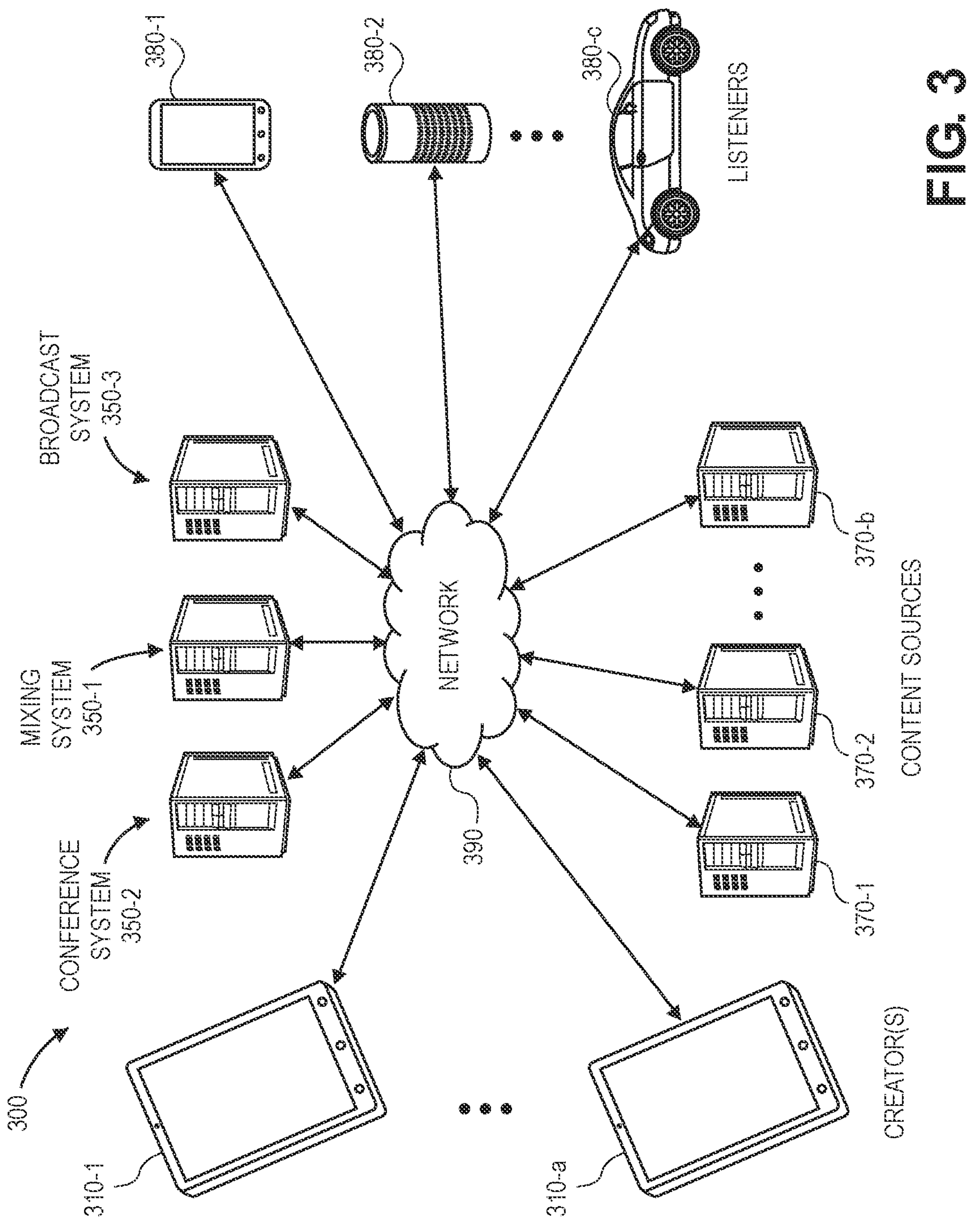
FIG. 3 is a view of aspects of one system for recommending media in accordance with embodiments of the present disclosure.

Referring to FIG. 3, a view of aspects of one system for recommending media in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1G. As is shown in FIG. 3, the system 300 includes computer systems or devices of a plurality of creators 310-1 . . . **310-*a*, a mixing system 350-1, a conference system 350-2, a broadcast system 350-3, a plurality of content sources 370-1, 370-2 . . . 370-*b* and a plurality of listeners 380-1, 380-2 . . . 380-*c* that are connected to one another over a network 390**, which may include the Internet in whole or in part.

The creators 310-1 . . . **310-*a* may operate a computer system or device having one or more microphones, an interactive display, one or more speakers, one or more processors and one or more transceivers configured to enable communication with one or more other computer systems or devices. In some implementations, the creators 310-1 . . . 310-*a* may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-*a*** may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . **310-*a*, or any of the listeners 380-1, 380-2 . . . 380-*c*, e.g., by way of the conference system 350-2, or from any of the media sources 370-1, 370-2 . . . 370-*b* over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-*c*, in accordance with a broadcast plan (or a sequence of media content, or another schedule), or at the direction of the creators 310-1 . . . 310-*a*. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-*a***.

In some implementations, the mixing system 350-1 may receive media content from one or more of the media sources 370-1, 370-2 . . . **370-*b*, and cause the media content to be transmitted to one or more of the creators 310-1 . . . 310-*a* or the listeners 380-1, 380-2 . . . 380-*c* by the broadcast system 350-3. In some other implementations, the mixing system 350-1 may receive media content from one or more of the media sources 370-1, 370-2 . . . 370-*b*, and mix, or combine, the media content with any media content received from the creators 310-1 . . . 310-*a* or any of the listeners 380-1, 380-2 . . . 380-*c*, before causing the media content to be transmitted to one or more of the creators 310-1 . . . 310-*a* or the listeners 380-1, 380-2 . . . 380-*c* by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-*b*, e.g., cameras and/or microphones provided at a location of a sporting event, or any other event, and mix that media content with any media content received from any of the creators 310-1 . . . 310-*a* or any of the listeners 380-1, 380-2 . . . 380-*c*. In such embodiments, the creators 310-1 . . . 310-*a* may act as sportscasters, news anchors, weathermen, reporters or others, and may generate a media program that combines audio or video content captured from a sporting event or other event of interest, along with audio or video content received from one or more of the creators 310-1 . . . 310-*a* or any of the listeners 380-1, 380-2 . . . 380-*c* before causing the media program to be transmitted to the listeners 380-1, 380-2 . . . 380-*c* by the conference system 350-2 or the broadcast system 350-3**.

In some implementations, the conference system 350-2 may establish two-way communications channels between any of the creators 310-1 . . . **310-*a* and, alternatively, any of the listeners 380-1, 380-2 . . . 380-*c*, who may be invited or authorized to participate in a media program, e.g., by providing media content in the form of spoken or sung words, music, or any media content, subject to the control or discretion of the creators 310-1 . . . 310-*a*. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-*a*. In some implementations, the mixing system 350-1 may effectively act as a virtual participant in such a conference, by transmitting media content received from any of the media sources 370-1, 370-2 . . . 370-*b* to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-***c*.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources 370-1, 370-2 . . . 370-*b* may be servers or other computer systems having media content stored thereon, or access to media content, that are configured to transmit media content to the creators 310-1 . . . 310-*a* or any of the listeners 380-1, 380-2 . . . 380-*c* in response to one or more instructions or commands from the creators 310-1 . . . 310-*a* or the mixing system 350-1. The media content stored on or accessible to the content sources 370-1, 370-2 . . . 370-*b* may include one or more advertisements, songs or media files, news programs, sports programs, weather reports or any other media files, which may be live or previously recorded. The number of content sources 370-1, 370-2 . . . 370-*b* that may be accessed by the mixing system 350-1, or the types of media content stored thereon or accessible thereto, is not limited.

The listeners 380-1, 380-2 . . . 380-*c* may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-*a*, with any of the content sources 370-1, 370-2 . . . 370-*b*, or with any of the listeners 380-1, 380-2 . . . 380-*c*, as necessary, to compile and seamlessly transmit media programs over digital channels (e.g., web-based or application-based), to devices of the creators 310-1 . . . 310-*a* or the listeners 380-1, 380-2 . . . 380-*c* in accordance with a broadcast plan, or subject to the control of the creators 310-1 . . . 310-*a*. Furthermore, in some implementations, one or more of the listeners 380-1, 380-2 . . . 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-*c*, the mixing system 350-1 may terminate one of the one-way channels with one of the listeners 380-1, 380-2 . . . 380-*c*, and cause the conference system 350-2 to establish a two-directional channel with that listener, thereby enabling that listener to not only receive but also transmit media content to the creators 310-1 . . . 310-*a* or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4:
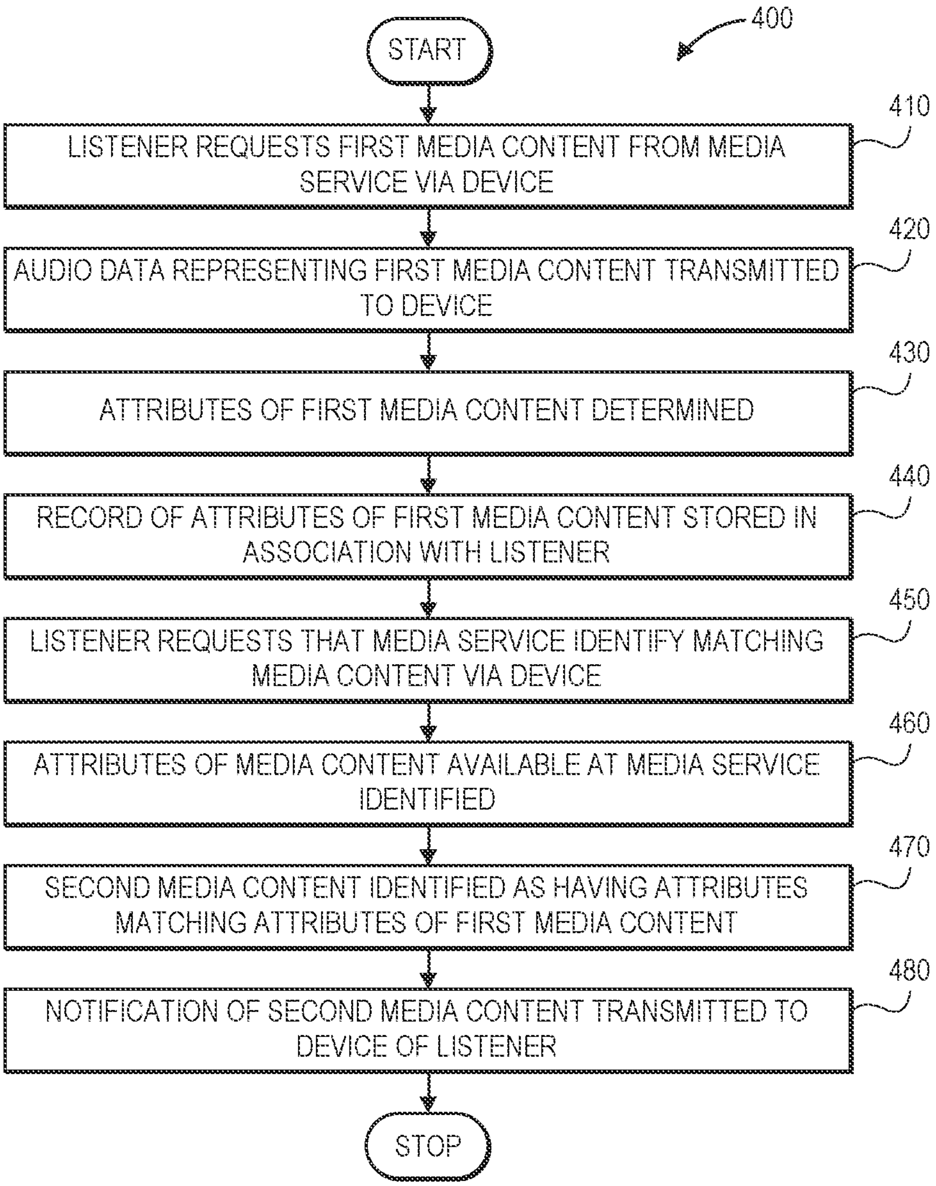
FIG. 4 is a flow chart of one process for recommending media in accordance with embodiments of the present disclosure.

Referring to FIG. 4, a flow chart 400 of one process for recommending media in accordance with embodiments of the present disclosure is shown.

At box 410, a listener requests first media content from a media service. For example, the first media content may be one of a series of episodes generated by a creator, or two or more creators, and may feature music, comedy, "talk" radio, interviews or any other content, such as advertisements, news, sports, weather, or other programming. The first media content may be offered at a regularly scheduled time, or at any other time, e.g., randomly or spontaneously. The listener may request the first media content by executing one or more interactions with a user interface of a general-purpose application (e.g., a browser) or a dedicated application for playing media executed by any type or form of computer device, e.g., a mobile device. Alternatively, the listener may request the first media content by way of one or more voice commands or utterances to a component or application configured to capture and interpret such commands or utterances, e.g., a smart speaker.

The media service may be any source for distributing media such as music, podcasts, or other media entities to devices of listeners over one or more networks. Alternatively, the listener may request media that is stored on the computer device, and need not be retrieved (e.g., streamed) from any service.

At box 420, audio data representing the first media content is transmitted to a device of the listener, e.g., in accordance with a broadcast plan or sequence of media content, or at the control or discretion of one or more creators. The audio data may be transmitted live, e.g., as the first media content is generated, or "on demand," e.g., where the first media content is maintained in a pre-recorded format. For example, in some implementations, and in response to the request received at box 410, a control system may establish a one-way communication channel with a computer device of the listener. Where the first media content is aired live, a control system may receive some or all of the audio data from a computer device associated with a creator of the first media content, or from any other source, e.g., a music source, and transmit the audio data to computer devices of any number of listeners via one-way communication channels. Alternatively, in some implementations, the control system may establish a two-way communication channel with the device of the listener, or with any number of other computer devices. Where the episode of the media program is aired "on demand," audio data representing the first media content may be retrieved by the control system from an external source and transmitted to computer devices of any number of listeners.

At box 430, one or more attributes of the episode of the first media content are determined. For example, one or more of the attributes may relate to a creator of the first media content, or an entity responsible for generating or selecting media to be included in the first media content. Additionally, one or more of the attributes may include a time or a date at which the first media content was originally aired, a time or date at which the first media content was transmitted to the device of the listener, or a duration of the first media content, as well as a content rating (e.g., maturity) of the first media content, or a topic, a theme, a genre, or another attribute of the first media content. The attributes may identify any media entities included in the first media content, as well as any qualitative or quantitative characteristics of the first media content, such as tempos (or beats per minute), intensities, frequencies (or pitches), or any other attributes of music or other media entities included in the first media content. The attributes may also include identities of any guests or other participants that provided some or all of the first media content, or any advertisements of goods or services included in the first media content.

At box 440, a record of the attributes of the first media content is stored in association with the listener. The record may be stored by a control system, or on any other computer device or system, in one or more alternate or virtual locations, e.g., in a "cloud"-based environment. Alternatively, the record may be stored by or on a computer device by which the listener received the audio data representing the first media content at box 420.

At box 450, the listener requests that the media service identify matching media content for the listener. For example, after listening to the first media content, the listener may be prompted to indicate whether the listener would like to receive a notification when other media content that is similar to the first media content is available. Such a prompt may be provided to the listener in any manner, such as by way of an application used by the listener to listen to the first media content, an electronic message (e.g., an E-mail, or an SMS or MMS text message), or in any other manner. Matching media content may be defined in any manner with respect to the first media content (or any other media) previously listened to by the listener, such as where one or more attributes of the first media content are consistent with one or more attributes of any of the other media content. Moreover, in some implementations, where the first media content represents an episode of a media program, a listener may request a notification when another episode of the media program is identified or otherwise becomes available, e.g., when a creator of the episode of the media program represented by the first media content schedules another episode of the media program, e.g., on a recurring or non-recurring basis. Alternatively, the listener may request that a communications channel be automatically established between a device of the listener and a control system when matching media content becomes available, and that the matching media content be automatically transmitted to the device of the listener.

At box 460, attributes of media content available via the media service are identified. For example, such attributes may include any number of corresponding attributes identified for the first media content at box 430, e.g., an identity of a creator, a time or a date at which the other media content is to be aired, a duration of other media content, a content rating (e.g., maturity) of the other media content, or a topic, a theme, a genre, or another attribute of the other media content, as well as identities of any media entities included in the other media content, or any qualitative or quantitative characteristics of the other media content, or others.

At box 470, second media content is identified as having attributes matching the attributes of the first media content. Where one or more attributes of the first media content previously determined at box 430 are consistent with one or more attributes of second media content available at the media service identified at box 460, then the second media content may be identified as a match for the first media content. For example, where the first media content and the second media content share a common creator, or a common topic, theme, genre, or any other attribute, e.g., any qualitative or quantitative characteristic in common, the first media content and the second media content may be determined to match one another. Where two or more sets of media content are identified as matches for the first media content, however, the sets of media content may be ranked or scored to the extent that attributes of such sets of media content match attributes of the first media content, and a highest-ranking or highest-scoring set of media content may be identified as matching the first media content.

At box 480, a notification of the second media content is transmitted to the device of the listener, and the process ends. The notification of the second media content may be provided to the device of the listener in any manner. For example, the notification may be provided in a window or other user interface rendered by the device of the listener, such as the window 140 shown in FIG. 1G. Alternatively, the notification may be provided to the listener in an electronic message of any kind, e.g., an electronic mail message, an SMS or MMS text message, or any other message. In some implementations, the notification may be accompanied by or presented with a selectable button, link or other interactive feature that may, upon being selected by the listener, establish a communications channel with a control system and cause audio data representing the second media content to be transmitted to the device of the listener. Alternatively, the listener may expressly request to receive the second media content by one or more gestures or other interactions with an application associated with the media service or any other source of media, or in any other manner.

The process of identifying matching media content that is available on a recurring or non-recurring basis may continue as long as the listener requests to receive notifications of such matching media content, and as long as such matching media content is available via the media service, or from any other source.

In some implementations, a listener may request to receive notifications of media content that is available on a recurring basis, e.g., episodes of a media program that are typically aired on regularly scheduled times and on regularly scheduled dates, or to automatically receive the media content on days or at times when such media content becomes available. Referring to 5A through 5D, views of aspects of one system for recommending media in accordance with embodiments of the present disclosure are shown. Except where otherwise noted, reference numerals preceded by the number "5" shown in FIGS. 5A through 5D indicate components or features that are similar to components or features having reference numerals preceded by the number "3" shown in FIG. 3, by the number "2" shown in FIG. 2A or FIG. 2B or by the number "1" shown in FIGS. 1A through 1G.

Figure 5A:
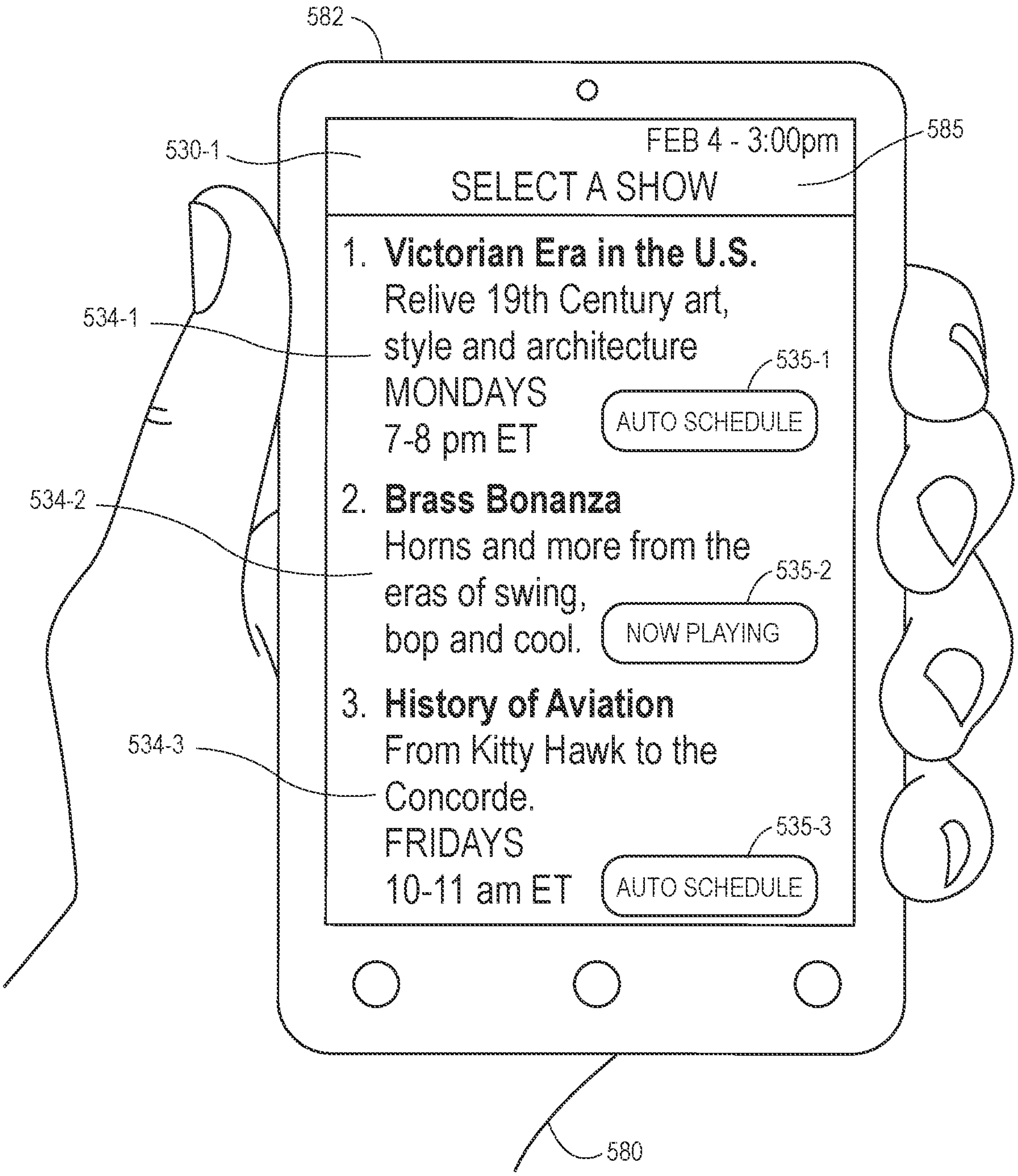
FIGS. 5A through 5D are views of aspects of one system for recommending media in accordance with embodiments of the present disclosure.

As is shown in FIG. 5A, a listener 580 executes one or more interactions with a mobile device 582 to request to receive media content, e.g., an episode of a media program. The mobile device 582 includes an interactive display 585 having a user interface 530-1 rendered thereon. The user interface 530-1 includes information regarding a plurality of media programs 534-1, 534-2, 534-3 that are made available to listeners on a recurring basis, including but not limited to titles of the media programs 534-1, 534-2, 534-3, text-based descriptions of the media programs 534-1, 534-2, 534-3, or identifiers of days or times when episodes of such media programs 534-1, 534-2, 534-3 are typically aired. Additionally, the user interface 530-1 further includes buttons 535-1, 535-2, 535-3 or other selectable features that may be selected in order to receive media content of an episode of any of the media programs 534-1, 534-2, 534-3 that are then being aired, or to automatically schedule to receive media content of such episodes when the media content becomes available.

Figure 5B:
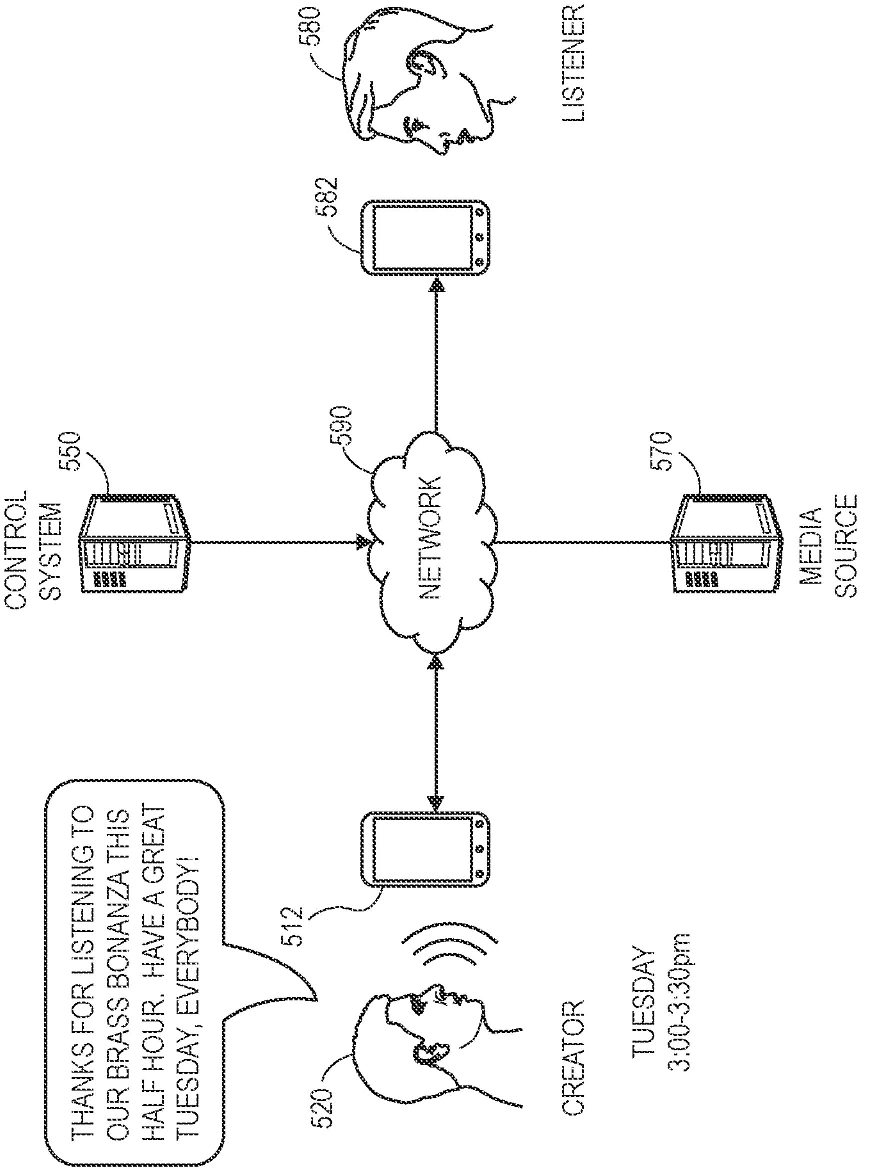

As is shown in FIG. 5B, upon selecting the button 535-2 associated with the media program 534-2, the listener 580 operates the mobile device 582 to receive media content representing an episode of the media program 534-2, which may be aired live or "on demand," e.g., in a pre-recorded format. The mobile device 582 is connected to a mobile device 512 of a creator 510, a control system 550 and any number of media sources 570 over one or more networks 590, which may include the Internet in whole or in part. In particular, and as is shown in FIG. 5B, the media content representing the episode of the media program 534-2 may include words or phrases spoken or sung by the creator 510, any media entities (e.g., songs, podcasts or others), or any other media content that is received via a one-way communication channel established between the control system 550 and the mobile device 582, or in any other manner.

Figure 5C:

As is shown in FIG. 5C, after the episode of the media content 534-2 has concluded, a user interface 530-2 is rendered on the interactive display 585. The user interface 530-2 includes one or more identifiers of the media program 534-2, as well as a set of information 536 regarding the media program 534-2. Additionally, the user interface 530-2 further includes a pair of buttons 538-1, 538-2 or other interactive features. The button 538-1 may be selected by the listener 580 to automatically connect the mobile device 582 to the control system 550 or any other computer device or system to receive media content representing a next episode of the media program 534-2, e.g., as the next episode is aired live, while the button 538-2 may be selected by the listener 580 to decline to automatically connect the mobile device 582 to the control system 550, or to decline to automatically receive media content representing the next episode.

Figure 5D:
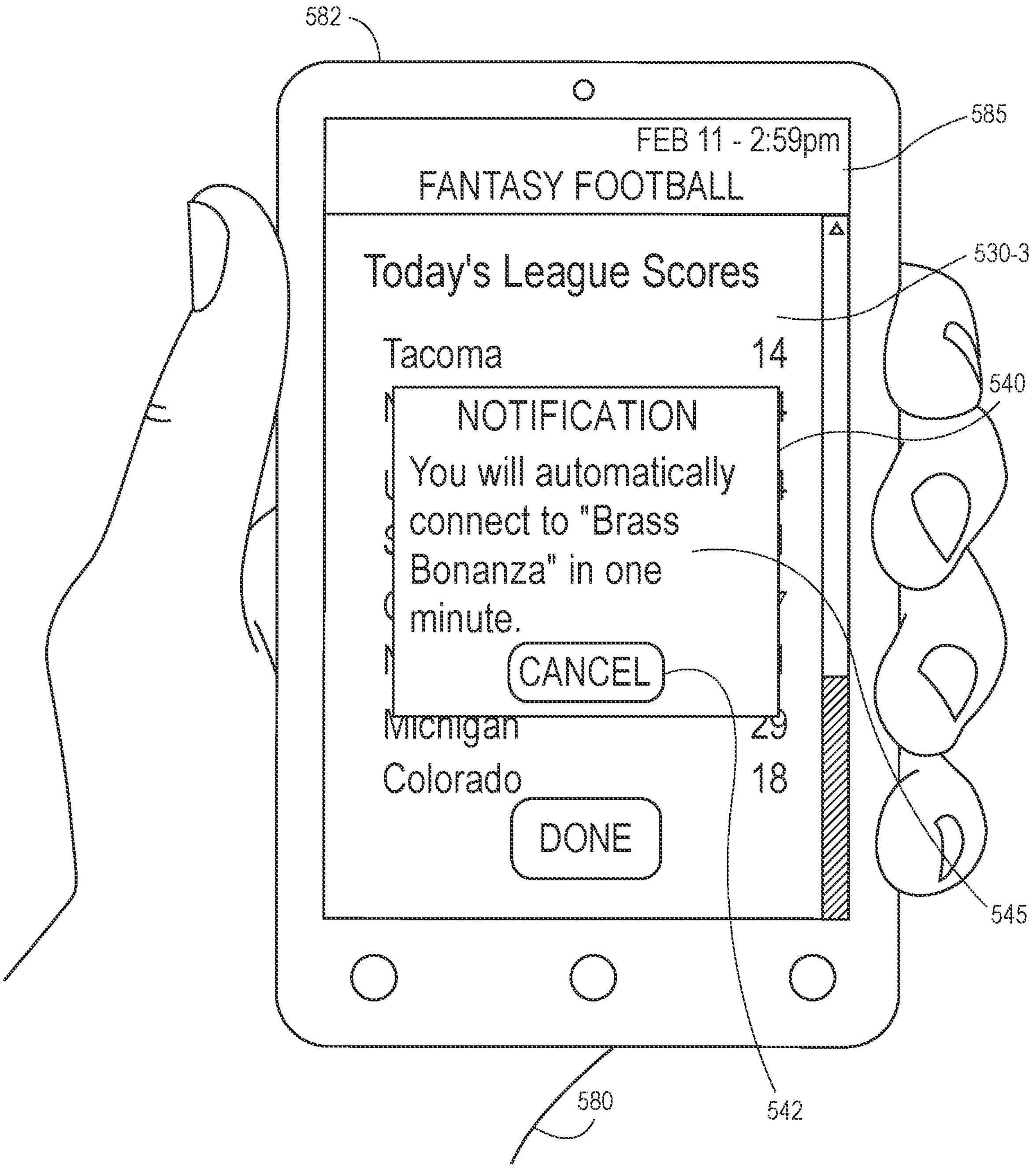

As is shown in FIG. 5D, after the listener 580 requests to automatically connect with the control system 550 and receive a next episode of the media program 534-2, a window 540 is rendered by the mobile device 582 over a user interface 530-3, e.g., one minute prior to a time and on a day when episodes of the media program 534-2 are typically aired. The window 540 includes information 545 informing the listener 580 that the mobile device 582 will be automatically connected to the next episode of the media program 534-2 in one minute, as well as a button 542 or another interactive feature that may be selected to stop the mobile device 582 from automatically receiving the next episode. If the listener 580 declines to select the button 542 within one minute, a communication channel (e.g., a one-way communication channel) may be established between the control system 550 and the mobile device 582, and media content representing the next episode of the media program 534-2 will be transmitted to the mobile device 582.

Figure 6:
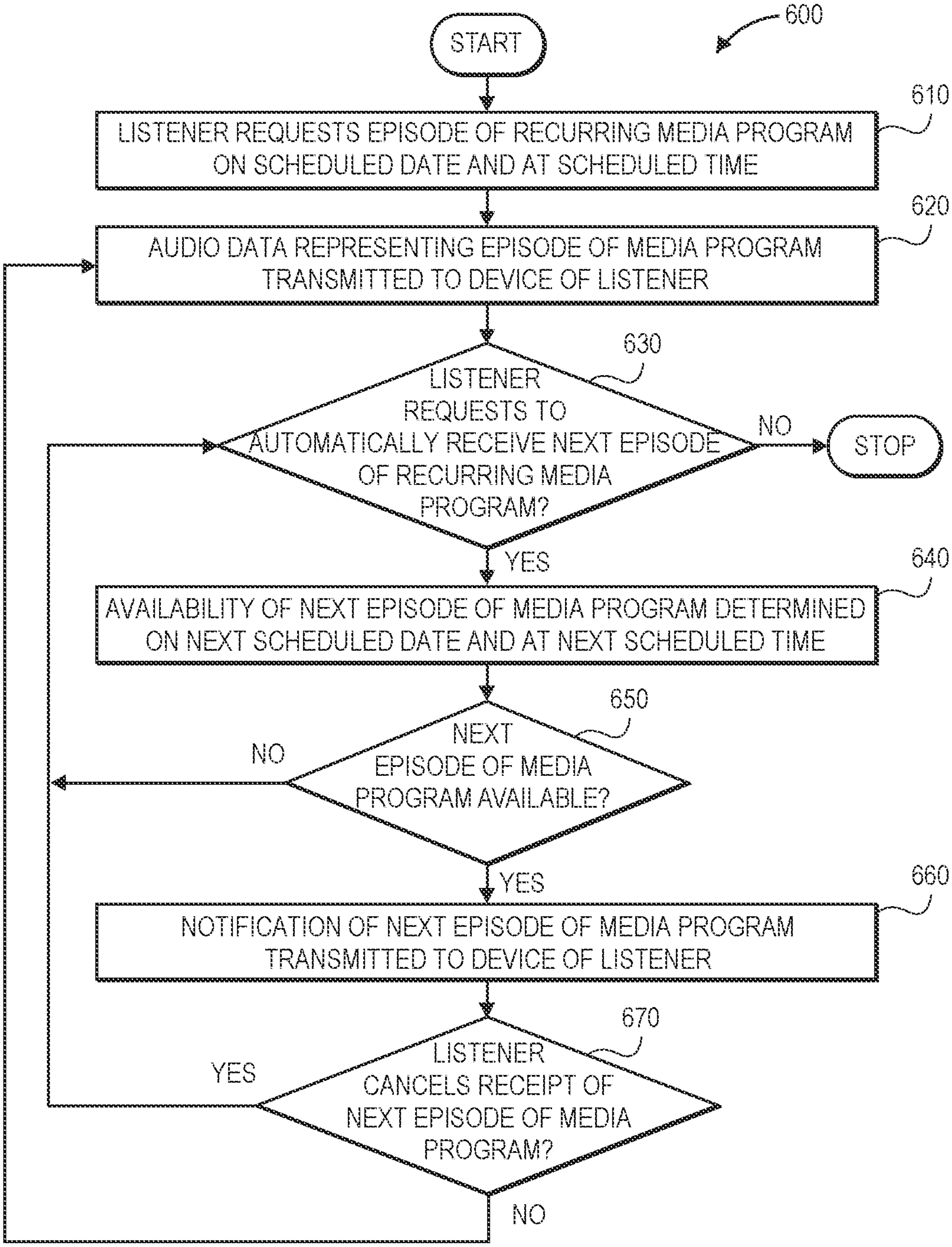
FIG. 6 is a flow chart of one process for recommending media in accordance with embodiments of the present disclosure.

Referring to FIG. 6, a flow chart 600 of one process for recommending media in accordance with embodiments of the present disclosure is shown.

At box 610, a listener requests an episode of a recurring media program on a scheduled day and at a scheduled time of the recurring media program. For example, the episode may be one of a series of episodes generated by a creator, or two or more creators, and may feature music, comedy, "talk" radio, interviews or any other content, such as advertisements, news, sports, weather, or other programming. The episode may be made available to listeners on the regularly scheduled day, e.g., a day of a week, month or year, and at the regularly scheduled time. The listener may request the episode by executing one or more interactions with a user interface of a general-purpose application (e.g., a browser) or a dedicated application for playing media executed by any type or form of computer device, e.g., a mobile device. Alternatively, the listener may request the episode by way of one or more voice commands or utterances to a component or application configured to capture and interpret such commands or utterances, e.g., a smart speaker.

At box 620, audio data representing the episode of the recurring media program is transmitted to a device of the listener, e.g., in accordance with a broadcast plan or sequence of media content, or at the control or discretion of one or more creators. The audio data may be transmitted live, e.g., as the media content is generated, or "on demand," e.g., in a pre-recorded format. For example, in some implementations, and in response to the request received at box 610, a control system may establish a one-way communication channel with a computer device of the listener. Where the episode of the recurring media program is aired live, a control system may receive some or all of the audio data from a computer device associated with a creator of the episode of the recurring media program, or from any other source, e.g., a music source, and transmit the audio data to computer devices of any number of listeners via one-way communication channels. Alternatively, in some implementations, the control system may establish a two-way communication channel with the device of the listener, or with any number of computer devices. Where the episode of the recurring media program is aired "on demand," audio data representing the episode may be retrieved by the control system from an external source and transmitted to computer devices of any number of listeners.

At box 630, whether the listener has requested to automatically receive a next episode of the recurring media program is determined. For example, after listening to one episode of the recurring media program, the listener may be prompted to indicate whether the listener would like to receive a notification when another episode of the recurring media program is available, or to automatically receive the next episode, e.g., via a communications channel that is automatically established between a device of the listener and a control system when the other episode of the recurring media program becomes available. If the listener does not request that the media service monitor for matching episodes, then the process ends.

If the listener requests to automatically receive a next episode of the recurring media program, however, then the process advances to box 640, where the availability of the next episode of the media program on the next scheduled date and at the next scheduled time is determined. For example, although episodes of a media program that are available on a recurring basis are typically aired on the same days or at the same times, in some instances, an episode of the media program may not be available on a scheduled date or at a scheduled time, due to unavailability of a creator or another participant, preemption by other media content, or for any other reason. If an episode of the media program is not available on the next scheduled date or at the next scheduled time, then the process returns to box 630, where whether the listener has again requested to automatically receive a next episode of the recurring media program is determined. For example, in some implementations, a listener may provide a standing instruction to automatically receive episodes of a recurring media program when such episodes become available. Alternatively, the listener may provide a one-time request to receive a next episode of the recurring media program that is not followed again unless the request is renewed.

If the next episode is available on the next scheduled date and at the next scheduled time, however, then the process advances to box 660, where a notification of the next episode of the media program is transmitted to the device of the listener. The notification of the next episode of the recurring media program may be provided to the device of the listener in any manner. For example, the notification may be provided in a window or other user interface rendered by the device, such as the window 140 shown in FIG. 1G or the window 540 shown in FIG. 5D. Alternatively, the notification may be provided to the listener in an electronic message, e.g., an electronic mail message, an SMS or MMS text message, or any other message.

In some implementations, the notification may indicate that the next episode will be transmitted to the device of the listener unless the listener cancels or otherwise opts out of receiving the next episode, such as is shown in FIG. 5D. Alternatively, in some implementations, the notification may require an affirmative action by the listener before the next episode will be transmitted to the device of the listener.

At box 670, whether the listener has canceled the receipt of the next episode of the media program is determined. If the listener has canceled or otherwise opted out of receiving the next episode of the media program, then the process returns to box 630, where whether the listener has again requested to automatically receive a next episode of the recurring media program is determined. If the listener has not canceled the receipt of the next episode, however, then the process returns to box 620, where audio data representing the next episode is transmitted to the device of the listener.

Figure 7:
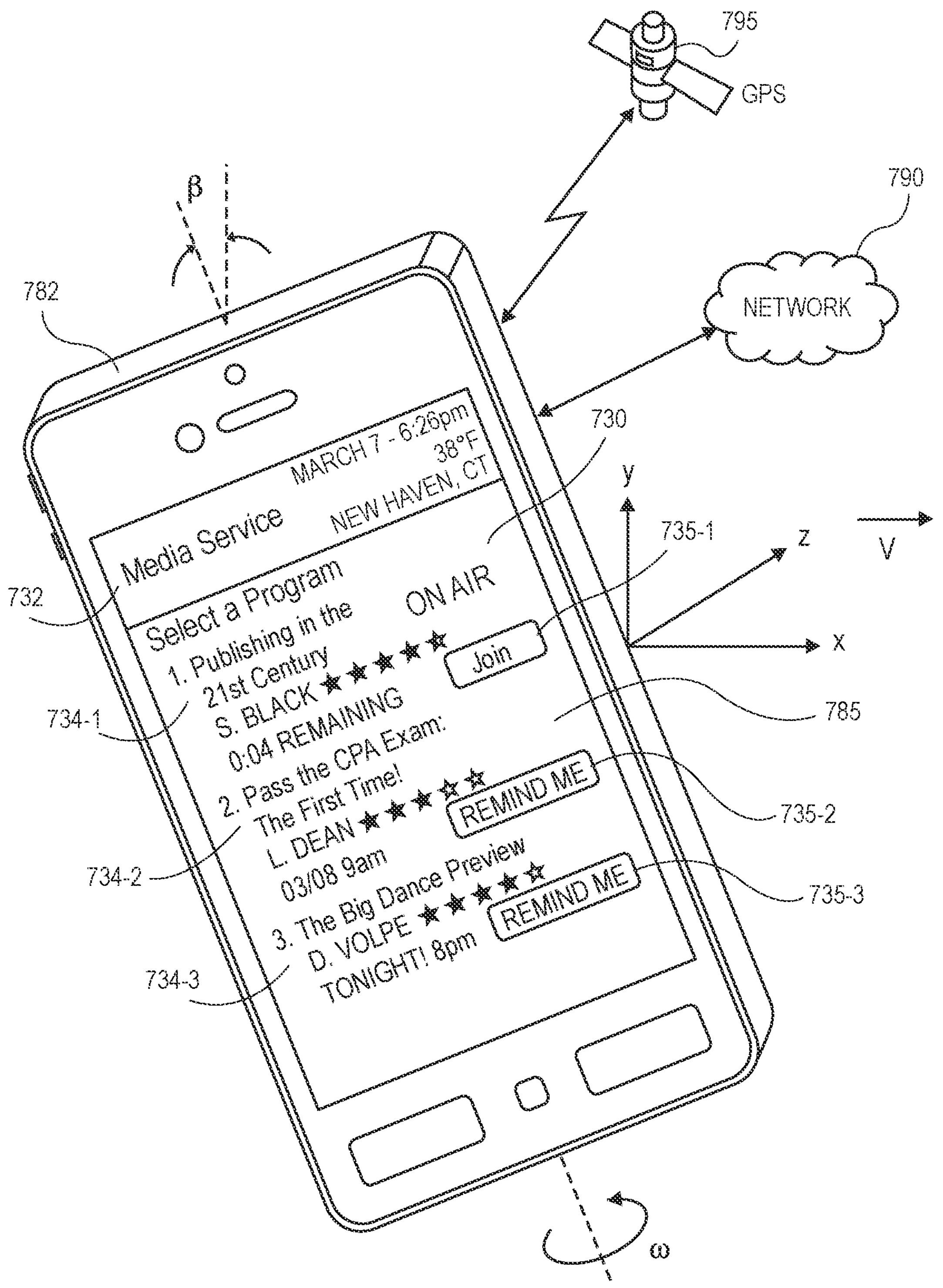
FIG. 7 is a view of aspects of one system for recommending media in accordance with embodiments of the present disclosure.

As is discussed above, information or data representing any form of actions or movements associated with a listener prior to or during the playing of media may be captured, recorded and/or analyzed in order to identify such actions or movements and to associate such actions or movements with the media. Referring to FIG. 7, a view of aspects of one system for recommending media in accordance with embodiments of the present disclosure is shown. Except where otherwise noted, reference numerals preceded by the number "7" shown in FIG. 7 indicate components or features that are similar to components or features having reference numerals preceded by the number "5" shown in FIGS. 5A through 5D, by the number "3" shown in FIG. 3, by the number "2" shown in FIG. 2A or FIG. 2B or by the number "1" shown in FIGS. 1A through 1G.

As is shown in FIG. 7, a mobile device 782 of a listener is shown. The mobile device 782 includes a user interface 730 rendered on a display 785.

The user interface 730 may be rendered by or associated with a general-purpose application (e.g., a browser) or a dedicated application for playing media of any type or form operating on the mobile device 782. The user interface 730 includes a header 732 of a page identifying a media service, a day and a time, a temperature and a location of the mobile device 782. The user interface 730 further includes details regarding a plurality of media content 734-1, 734-2, 734-3, e.g., episodes of media programs that may be aired on a recurring or non-recurring basis, either live or "on demand," or in a pre-recorded format. The user interface 730 also includes a selectable feature 735-1 that may be activated to cause the media content 734-1 that is currently being aired to be transmitted to the mobile device 782, as well as selectable features 735-2, 735-3 that may be activated to request a notification or another reminder of the media content 734-2, 734-3 when the media content 734-2, 734-3 becomes available.

The mobile device 782 is shown as being oriented at an angle β and rotating at an angular velocity ω. Additionally, the mobile device 782 is also shown as traveling at a velocity V having three-dimensional components (viz., along the respective x-, y- and z-axes). The mobile device 782 is also configured to communicate with any other computer devices or systems via one or more networks 790, which may include the Internet in whole or in part, and to transmit or receive position signals, e.g., to or from a GPS system 795, or from any other sources.

The mobile device 782 may be outfitted or equipped with one or more sensors (e.g., accelerometers, gyroscopes, or GPS receivers) that may capture and interpret data to determine a position, a velocity or an acceleration of the mobile device 782, or an angular orientation, an angular velocity or an angular acceleration of the mobile device 782.

In accordance with implementations of the present disclosure, information or data regarding actions or movements by a listener may be captured and interpreted, and a scalar or vector representative of such actions or movements may be generated based on the information or data. The scalar or vector may be associated with any media being listened to by the listener at the time of such actions or movements, e.g., any of the media content 734-1, 734-2, 734-3, or other media content. Subsequently, when information or data captured by the mobile device 782 indicates that the listener is performing the same actions or movements, or similar actions or movements, media content that was being consumed by the listener at the time that the listener previously performed the actions or movements may be used to identify media content for the listener, and to recommend the media content to the listener.

Referring to FIGS. 8A through 8J, views of aspects of one system for recommending media in accordance with embodiments of the present disclosure is shown. Except where otherwise noted, reference numerals preceded by the number "8" shown in FIGS. 8A through 8J indicate components or features that are similar to components or features having reference numerals preceded by the number "7" shown in FIG. 7, by the number "5" shown in FIGS. 5A through 5D, by the number "3" shown in FIG. 3, by the number "2" shown in FIG. 2A or FIG. 2B or by the number "1" shown in FIGS. 1A through 1G.

Figure 8A:
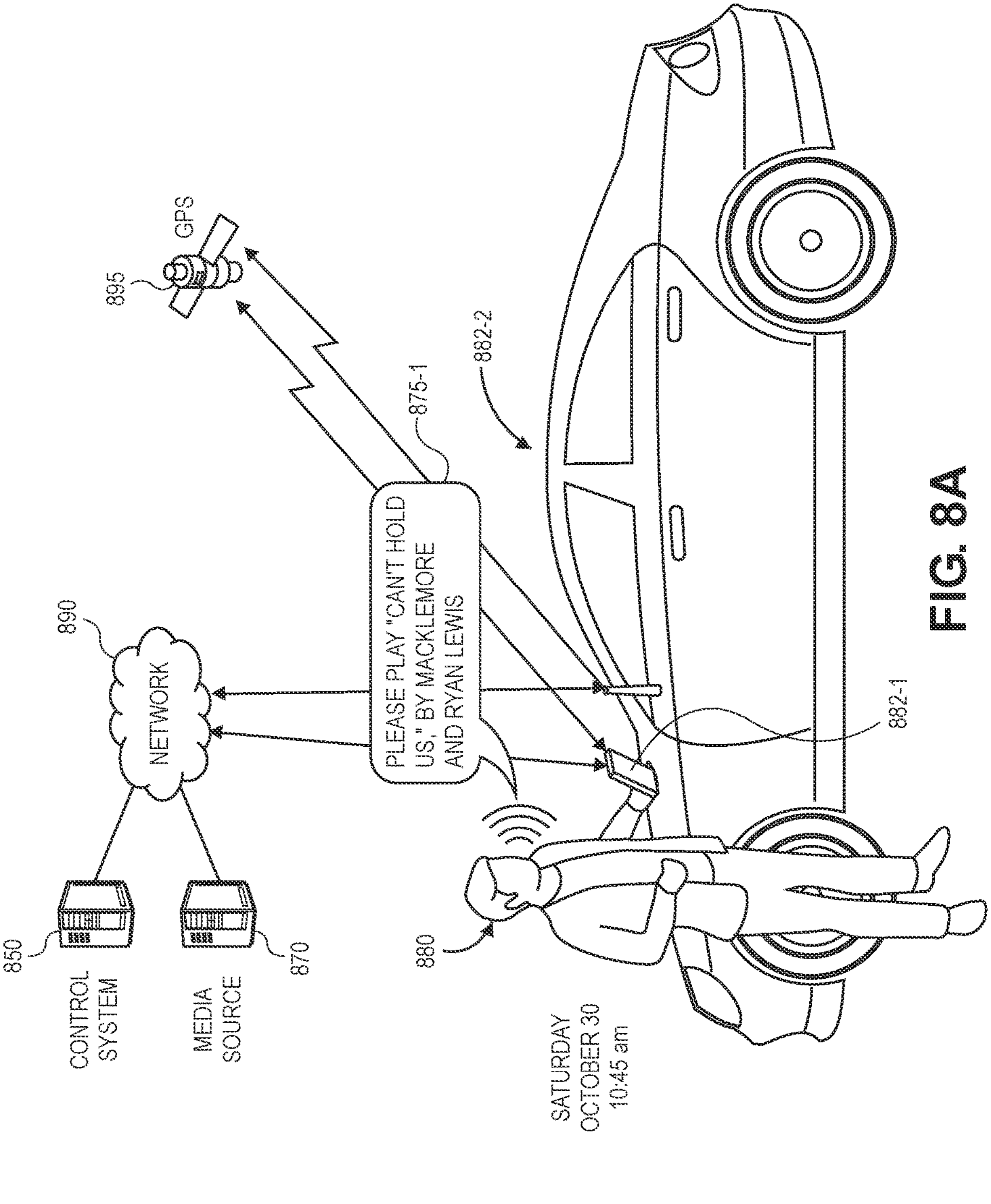
FIGS. 8A through 8J are views of aspects of one system for recommending media in accordance with embodiments of the present disclosure.

As is shown in FIG. 8A, a listener 880 having a mobile device 882-1 prepares to enter and operate an automobile 882-2 on a day and at a time, viz., Saturday, October 30, at 10:45 a.m. Each of the mobile device 882-1 and the automobile 882-2 is configured to communicate with a control system 850 or a media source 870, or with any other computer devices over one or more networks 890, which may include the Internet in whole or in part. Each of the mobile device 882-1 and the automobile 882-2 is also configured to transmit and/or receive position signals with one or more components of a GPS system 895. Each of the mobile device 882-1 and the automobile 882-2 may also be outfitted or equipped with one or more gyroscopes, accelerometers or other sensors for determining positions, orientations, velocities, or accelerations along or about one or more axes.

As is further shown in FIG. 8A, the listener 880 requests media content from the mobile device 882-1 or the automobile 882-2 by an utterance of one or more voice commands, viz., "please play 'Can't Hold Us' by Macklemore & Ryan Lewis." The mobile device 882-1 or the automobile 882-2, or any auxiliary systems, may be outfitted with one or more microphones or other acoustic sensors for capturing audio data representing the utterance, and interpreting the audio data to identify a request for a media entity 875-1 represented therein. In some implementations, the mobile device 882-1 may be configured to interpret the audio data to identify the media entity 875-1, and to receive media content representing the media entity 875-1 over the one or more networks 890, e.g., from the control system 850 or the media source 870, before causing the media content to be played by one or more audio speakers within the automobile 882-2. In some other implementations, either the automobile 882-2 or the mobile device 882-1 may be configured to interpret the audio data, to identify the media entity 875-1, to receive the media content, and to cause the media content to be played by one or more audio speakers within the automobile 882-2. In some implementations, the listener 880 may utter a "wake word" or like term prior to uttering the voice commands, and the mobile device 882-1 or the automobile 882-2 may interpret the voice commands upon recognizing the "wake word" or like term. In some implementations, the listener 880 may activate one or more buttons or other interactive features to select the media entity 875-1, or to indicate that he or she will utter one or more of such voice commands requesting the media entity 875-1.

Figure 8B:
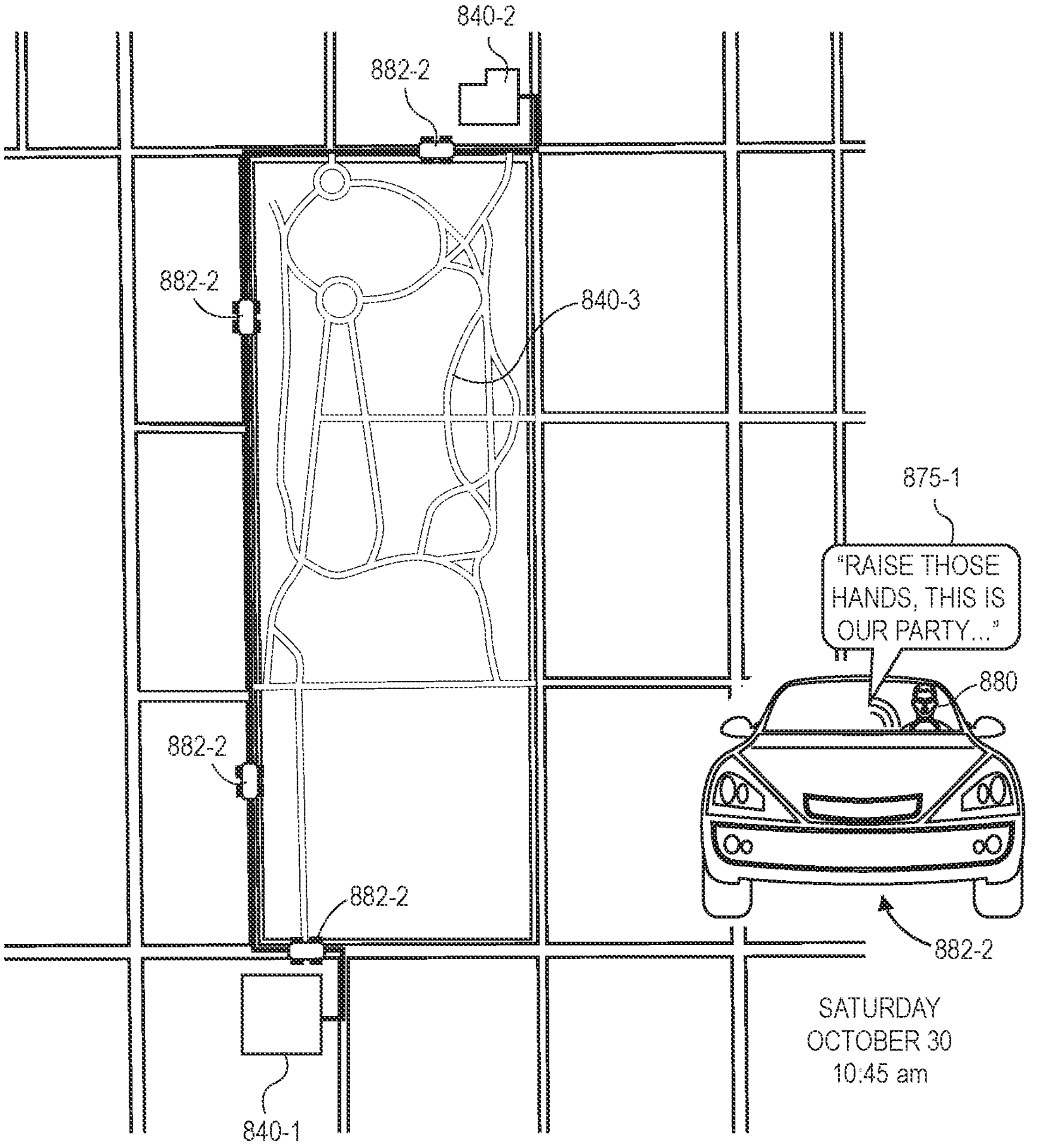

As is shown in FIG. 8B, as the listener 880 travels within the automobile 882-2 on a route from an origin 840-1 to a destination 840-2, within a vicinity of an area 840-3 (e.g., a park or a like setting), the listener 880 listens to the media entity 875-1 identified in the utterance. Additionally, information or data regarding actions or movements of the listener 880 along the route from the origin 840-1 to the destination 840-2, or within the vicinity of the area 840-3, may be captured by one or more sensors provided on the mobile device 882-1 or the automobile 882-2 and interpreted. For example, one or more position sensors, gyroscopes, accelerometers or other sensors of the mobile device 882-1 or the automobile 882-2 may determine one or more positions or orientations of the mobile device 882-1 or the automobile 882-2 over time, as well as velocities or accelerations of the mobile device 882-1 or the automobile 882-2 along or about one or more axes.

Figure 8C:
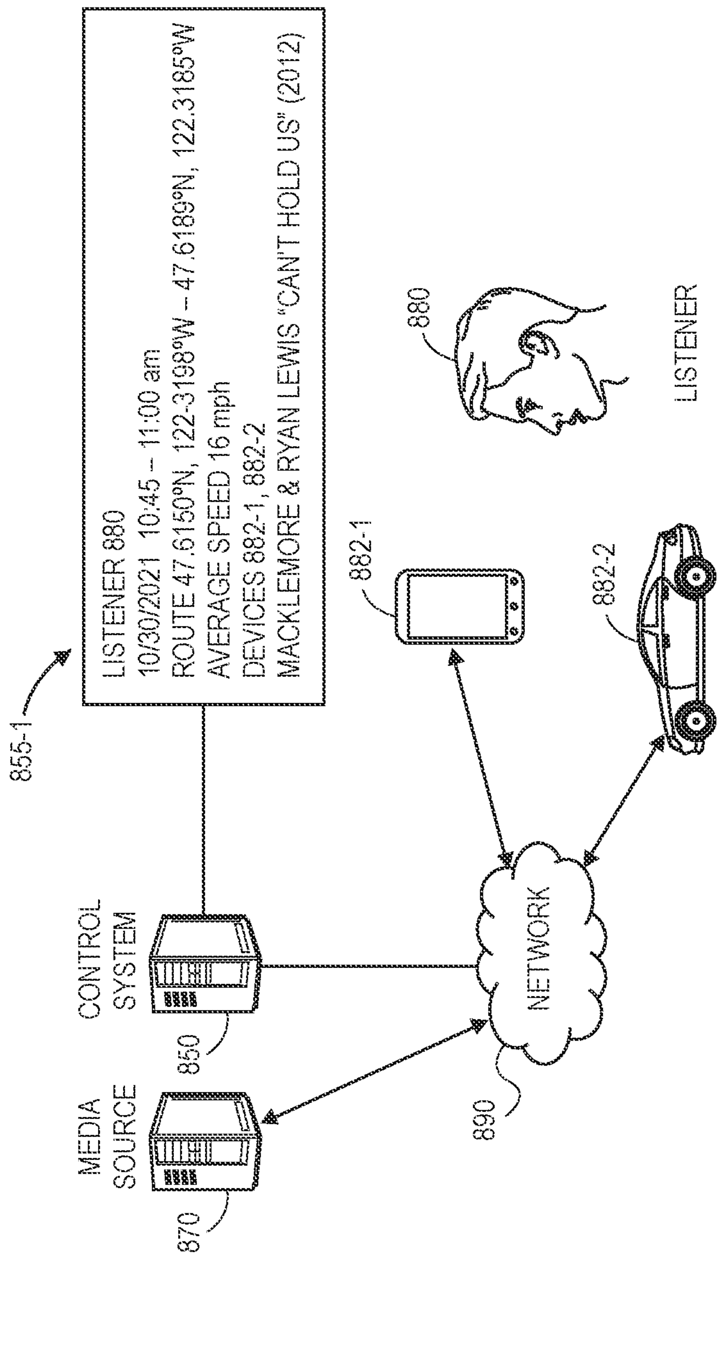

As is shown in FIG. 8C, a record 855-1 of the actions or movements of the listener 880 and the media entity 875-1 may be generated, e.g., to represent a pattern of activity of the listener 880, and stored by the control system 850. For example, the record 855-1 includes an identifier of the listener 880, as well as the time or the day on which the listener 880 listened to the media entity 875-1 while traveling along the route from the origin 840-1 to the destination 840-2, and within the vicinity of the area 840-3. The record 855-1 further identifies an average speed or velocity of the listener 880, a device on which the listener 880 listened to the media entity 875-1, viz., the mobile device 882-1 or the automobile 882-2, and the media entity 875-1 itself. In some implementations, a scalar or vector representative of such positions, orientations, velocities or accelerations, or of any actions or movements identified from such positions, orientations, velocities or accelerations, may be determined and stored in association with the listener 880 and the media entity 875-1.

The record 855-1 of the actions or movements of the listener 880 and the media entity 875-1 may be compared to information or data regarding other actions or movements of the listener 880, or actions or movements of other listeners. Where such actions or movements are similar to those represented in the record 855-1, one or more media entities may be identified based on the media entity 875-1, and recommended to the listener 880, or to the other listeners that performed the actions or movements.

Figure 8D:
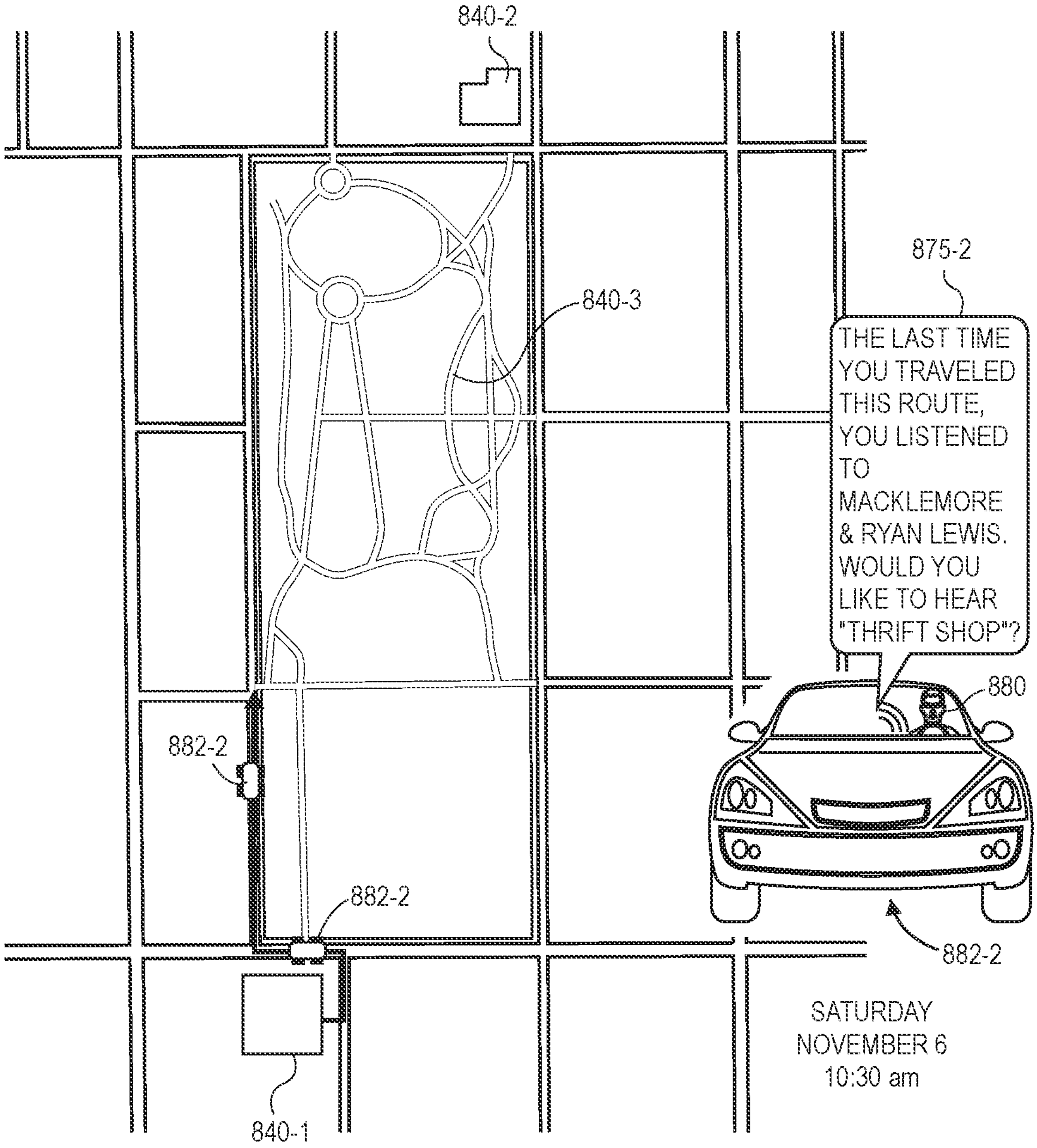

As is shown in FIG. 8D, when the listener 880 again travels on or near the same route from the origin 840-1 to the destination 840-2, or within a vicinity of the area 840-3, on another day or at another time, viz., Saturday, November 6, at 10:30 a.m., the mobile device 882-1 or the automobile 882-2 may capture data regarding the actions or movements of the listener 880 and interpret the data to identify media content for the listener 880 based on the record 855-1. For example, the actions or movements of the listener 880 in operating the automobile 882-2, such as in traveling from the origin 840-1 to the destination 840-2 or within a vicinity of the area 840-3 along the same or a similar route (e.g., along the same or proximate roads or streets) identified in the record 855-1, at similar speeds identified in the record 855-1, on the same day of the week (viz., Saturday) or at a similar time identified in the record 855-1, may be deemed similar to the actions or movements represented in the record 855-1, and a media entity similar to the media entity 875-1 identified in the record 855-1 may be identified for the listener 880 accordingly.

A media entity 875-2 may be identified and recommended to the listener 880 based on the media 875-1, upon determining that any of the actions or movements of the listener 880 shown in FIGS. 8A and 8B, or a pattern of activity of the listener 880 defined from such actions or movements, is similar to any of the actions or movements of the listener 880 represented in the record 855-1, or a pattern of activity of the listener 880 defined from the actions or movements represented in the record 855-1. For example, as is shown in FIG. 8D, the mobile device 882-1 or the automobile 882-2 may play media content recommending another media entity 875-2 to the listener 880, viz., "the last time you traveled this route, you listened to Macklemore & Ryan Lewis. Would you like to hear 'Thrift Shop'?" The listener 880 may elect to listen to the media entity 875-2, or decline to do so. If the listener 880 elects to listen to the media entity 875-2, the record 855-1 (or another record) may be updated accordingly to reflect an association between such actions or movements, or a pattern of activity defined from such actions or movements, and the media entity 875-2.

Figure 8E:
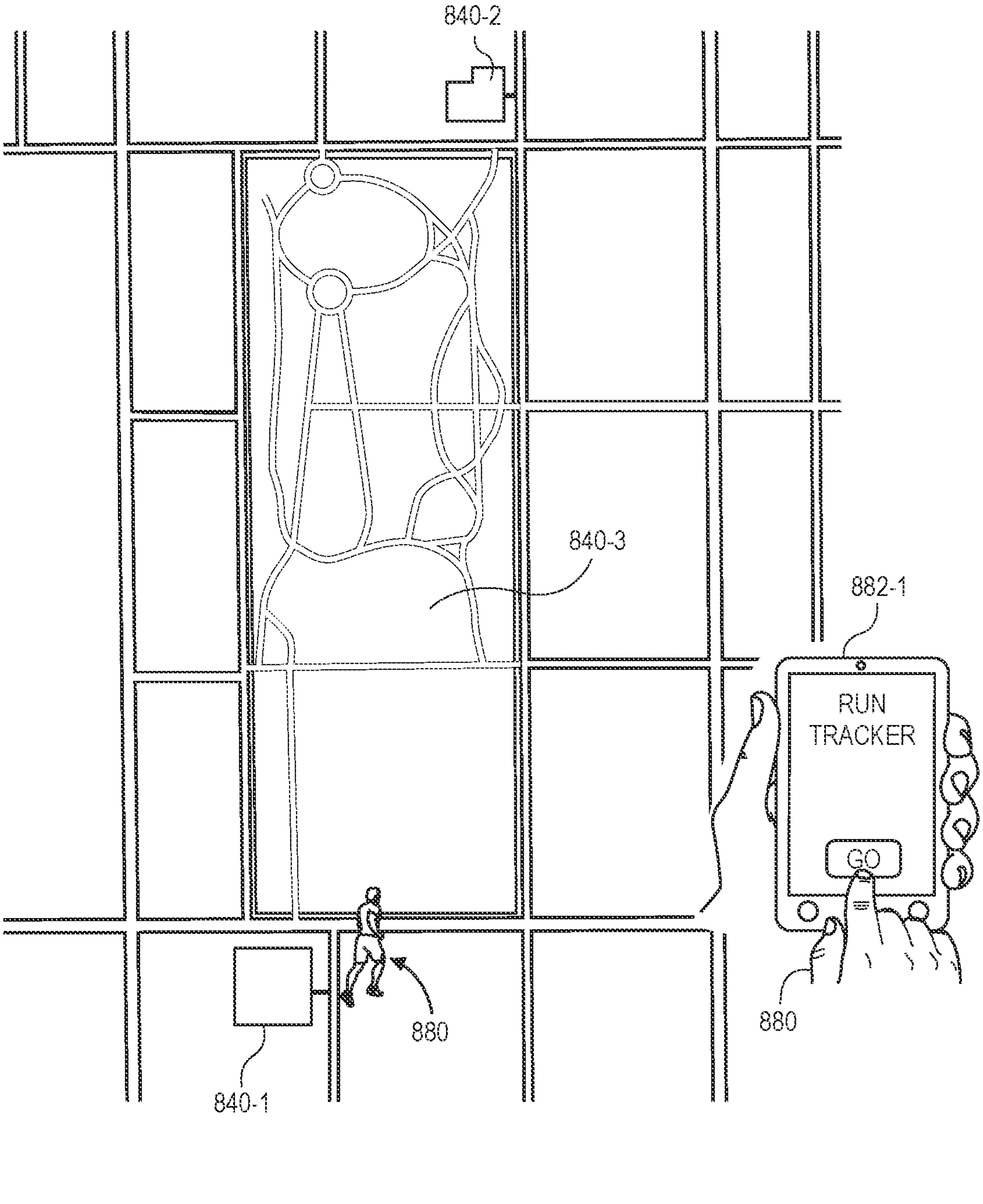
Figure 8F:
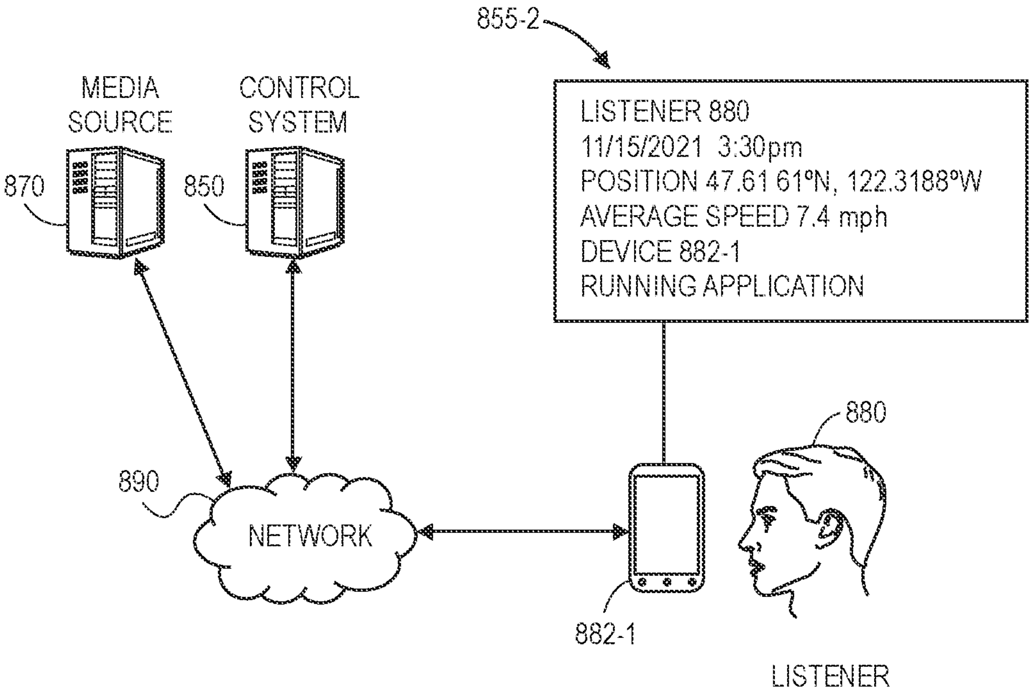

Additionally, as is shown in FIG. 8E, the listener 880 activates an application for tracking positions, velocities or other data during exercise, e.g., running, within a vicinity of the origin 840-1 or the area 840-3. As is shown in FIG. 8F, once the listener 880 activates the application, a record 855-2 of information or data regarding actions or movements of the listener 880 is determined and provided to the control system 850 over the one or more networks 890. For example, and as is shown in FIG. 8F, the record 855-2 identifies the listener 880, as well as a day and a time at which the listener 880 activated the application, a position of the mobile device 882-1 or the listener 880, an average speed or velocity of the mobile device 882-1 or the listener 880, along with the mobile device 882-1 and the application activated by the listener 880.

Figure 8G:
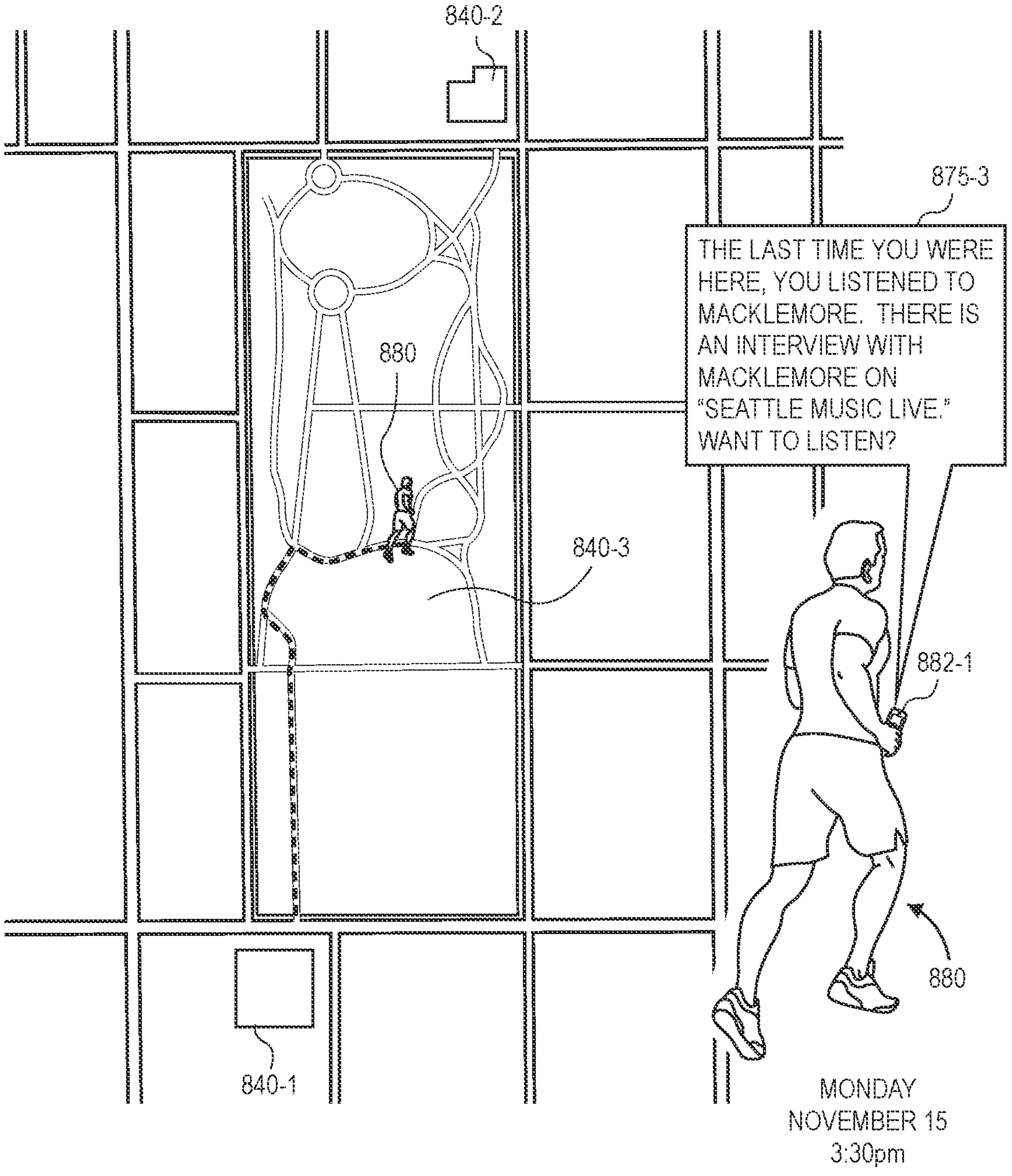

As is shown in FIG. 8G, as the listener 880 engages in one or more actions or movements identified or determined from the record 855-2, the mobile device 882-1 or the control system 850 determine that at least one attribute of the listener 880 or the mobile device 882-1, e.g., a location, is consistent with one or more locations identified in the record 855-1, and identifies a media entity 875-3, viz., a relevant interview, for the listener 880 accordingly. For example, as is shown in FIG. 8G, with the listener 880 traveling through the area 840-3, the mobile device 882-1 plays audio data identifying the media entity 875-3 to the listener 880, viz., “the last time you were here, you listened to Macklemore. There is an interview with Macklemore on ‘Seattle Music Live.’ Want to listen?” Alternatively, the mobile device 882-1 or the control system 850 may inform the listener 880 that the media entity 875-3 is recommended in any other manner, e.g., by one or more electronic messages. The listener 880 may elect to listen to the media entity 875-3 by one or more voice commands, or one or more gestures or other interactions with the mobile device 882-1, or decline to listen to the media entity 875-3. If the listener 880 elects to listen to the media entity 875-3, the record 855-2 (or another record) may be updated accordingly to reflect an association between such actions or movements, or a pattern of activity defined from such actions or movements, and the media entity 875-3, and stored in association with the listener 880.

Figure 8H:
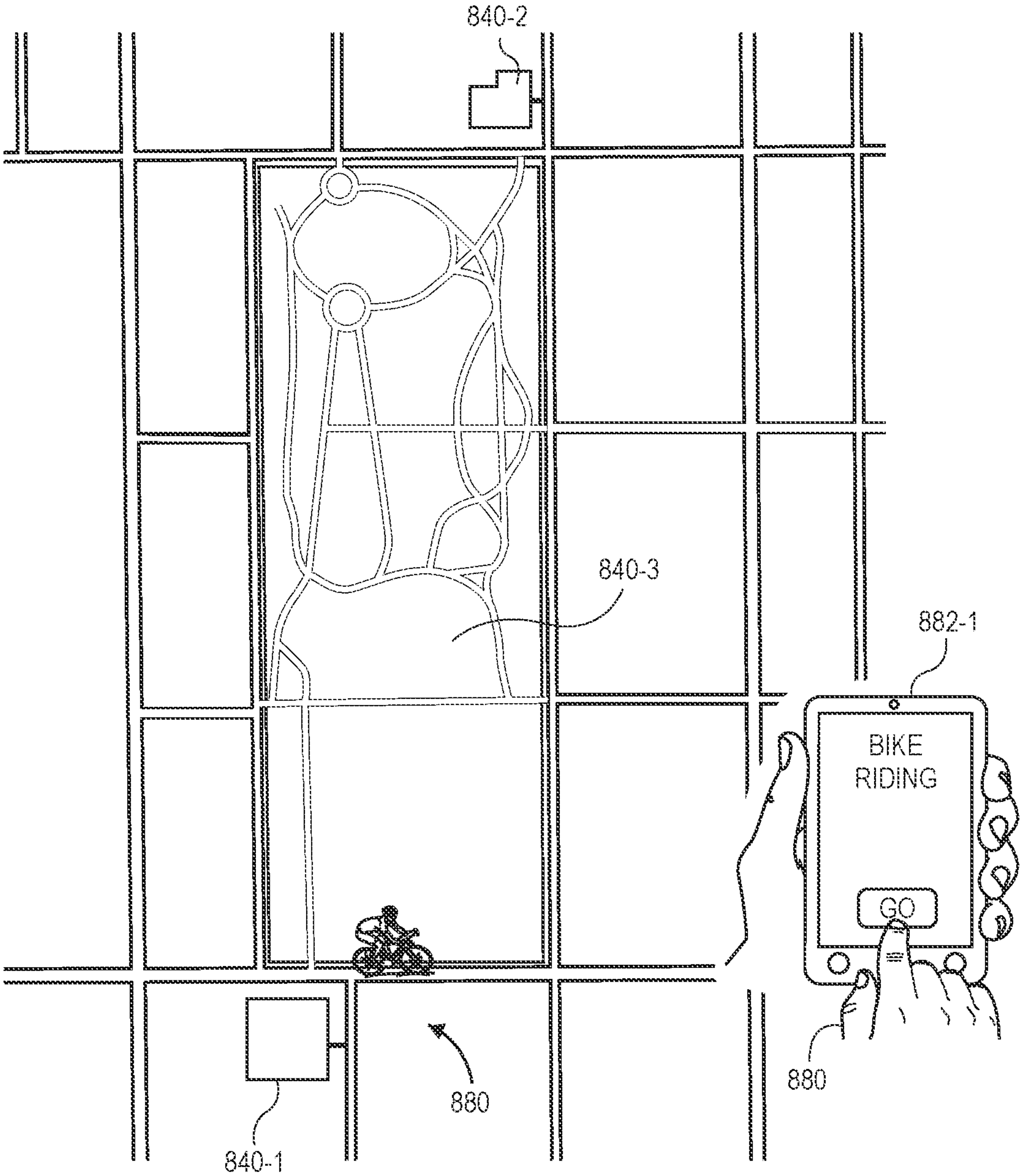
Figure 8I:
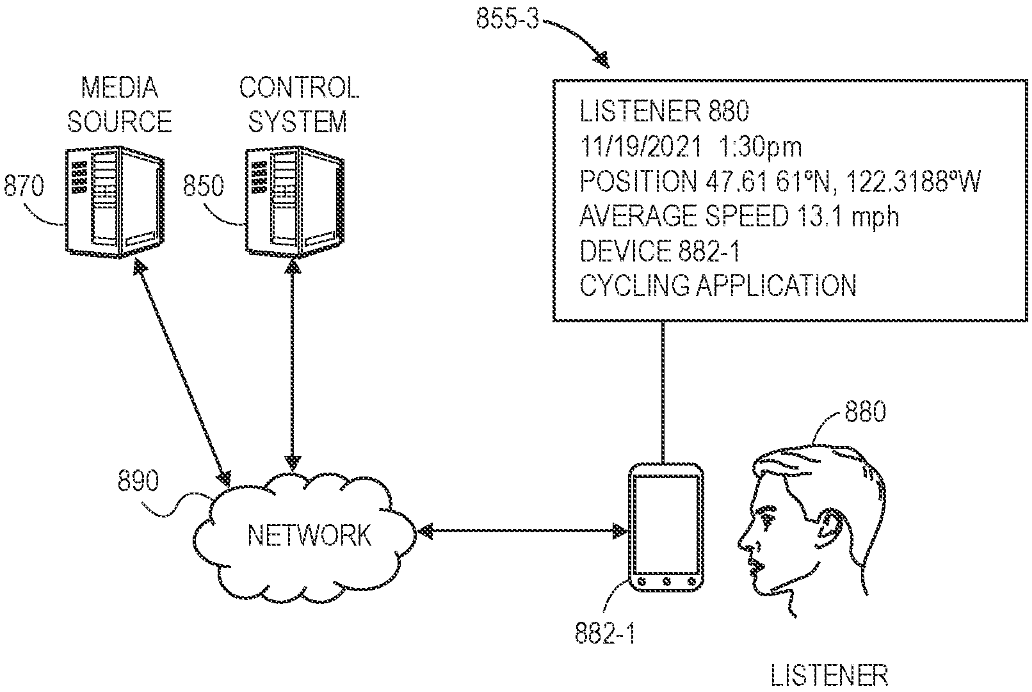

Similarly, as is shown in FIG. 8H, the listener 880 activates another application for tracking positions, velocities or other data during exercise, e.g., cycling, within a vicinity of the origin 840-1 or the area 840-3. As is shown in FIG. 8I, once the listener 880 activates the application, a record 855-3 of information or data regarding actions or movements of the listener 880 is determined and provided to the control system 850 over the one or more networks 890. For example, and as is shown in FIG. 8I, the record 855-3 identifies the listener 880, as well as a day and a time at which the listener 880 activated the other application, a position of the mobile device 882-1 or the listener 880, an average speed or velocity of the mobile device 882-1 or the listener 880, along with the mobile device 882-1 and the application activated by the listener 880.

Figure 8J:
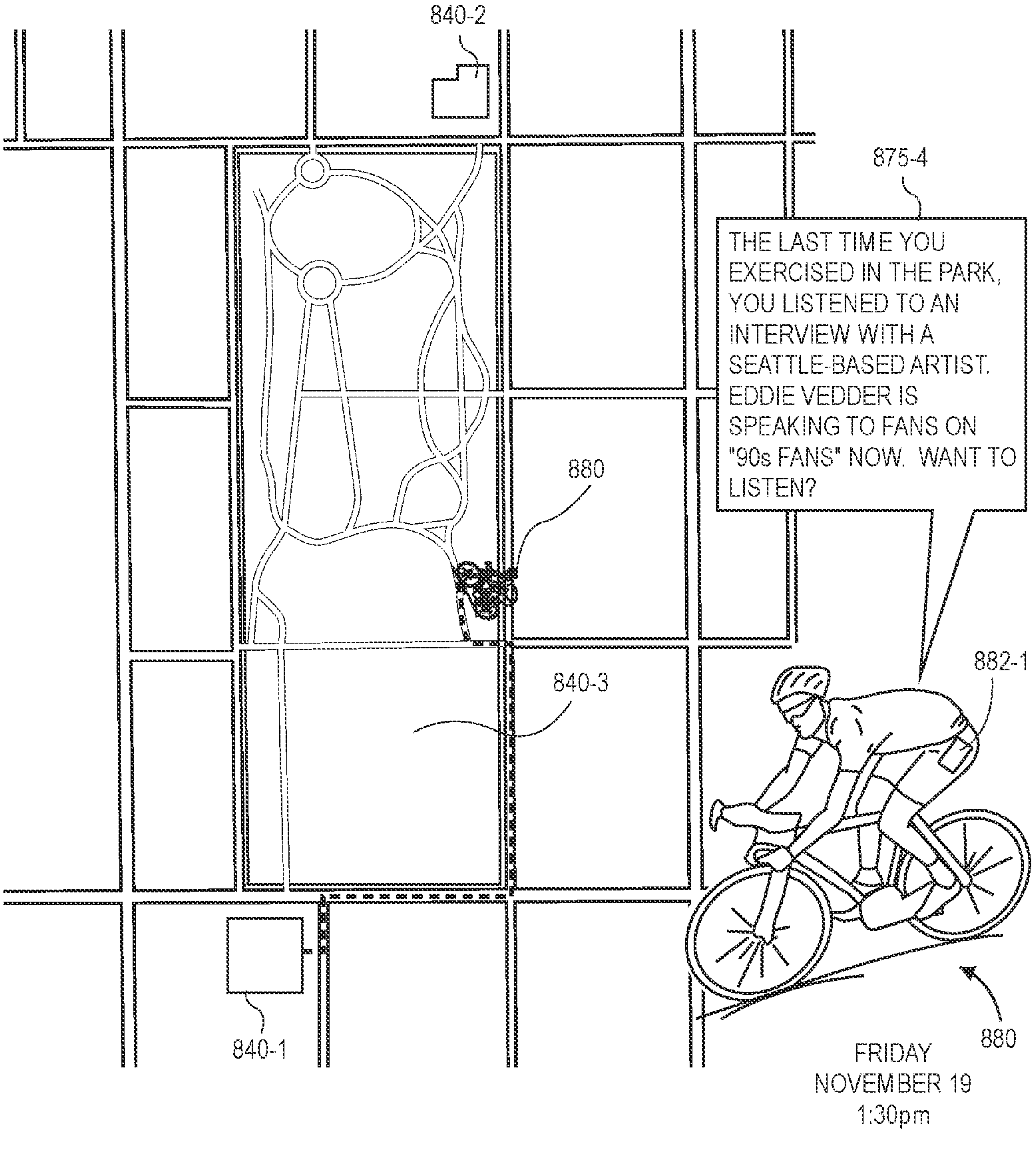

As is shown in FIG. 8J, as the listener 880 engages in one or more actions or movements identified or determined from the record 855-3, the mobile device 882-1 or the control system 850 determine that at least one attribute of the listener 880 or the mobile device 882-1, e.g., exercise, or traveling in or within a vicinity of the area 840-3, is consistent with one or more attributes identified in the record 855-1 or the record 855-2, and identifies a media entity 875-4, viz., another relevant interview, for the listener 880 accordingly. For example, as is shown in FIG. 8J, with the listener 880 exercising in the area 840-3, the mobile device 882-1 plays audio data identifying the media entity 875-4 to the listener 880, viz., “the last time you exercised in the park, you listened to an interview with a Seattle-based artist. Eddie Vedder is speaking to fans on “90s Fans' now. Want to listen?” Alternatively, the mobile device 882-1 or the control system 850 may inform the listener 880 that the media entity 875-4 is recommended in any other manner, e.g., by one or more electronic messages. The listener 880 may elect to listen to the media entity 875-4 by one or more voice commands, or one or more gestures or other interactions with the mobile device 882-1, or decline to listen to the media entity 875-4.

If the listener 880 elects to listen to the media entity 875-4, the record 855-3 (or another record) may be updated accordingly to reflect an association between such actions or movements, or a pattern of activity defined from such actions or movements, and the media entity 875-4, and stored in association with the listener 880.

Figure 9:
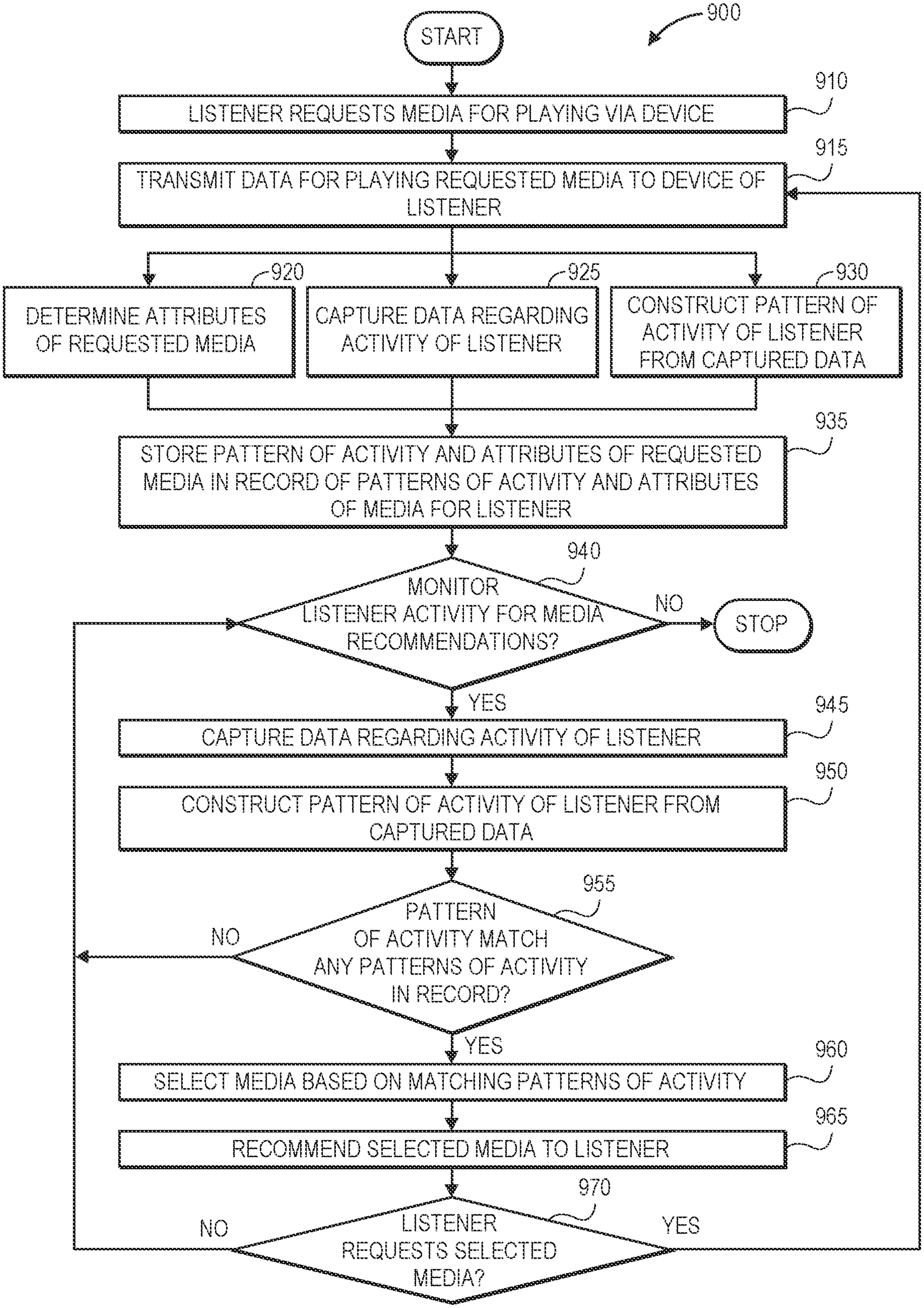
FIG. 9 is a flow chart of one process for recommending media in accordance with embodiments of the present disclosure.

Referring to FIG. 9, a flow chart 900 of one process for recommending media in accordance with embodiments of the present disclosure is shown.

At box 910, a listener requests media for playing via a device. For example, the media may be stored on the device, or offered by a media service in communication with the device, e.g., by streaming. The media may be of any type or form, and may, in some implementations, include any number of media entities such as songs, podcasts, or others, as well as media content representing words or phrases spoken or sung by a creator or any other individuals. In some implementations, the media requested by the listener may be an episode of a media program, which may be aired live on a recurring or non-recurring basis. The listener may request the episode by executing one or more gestures or other interactions with a user interface of a general-purpose application (e.g., a browser) or a dedicated application for playing media on any type or form of computer device, e.g., a mobile device. Alternatively, the listener may request the episode by way of one or more voice commands or utterances to a component or application configured to capture and interpret such commands or utterances, e.g., a smart speaker.

At box 915, data representing the requested media is transmitted to the device of the listener over the one or more networks. For example, the data may be transmitted live, e.g., as the content is generated, or “on demand,” e.g., in a pre-recorded format, via a communications channel established between the device and a control system or any other system.

At box 920, one or more attributes of the requested media are determined. Such attributes may include or relate to a creator of the requested media, a time or a date at which the requested media was originally aired, a time or date at which the requested media was transmitted to the device of the listener at box 915, a duration of the requested media, a content rating of the requested media, or a topic, a theme, a genre, or another attribute of the requested media. The attributes may also identify any qualitative or quantitative characteristics of the media, or any other aspect of the requested media.

In parallel, at box 925, data regarding activity of the listener is captured. Prior to or during the playing of the requested media, one or more sensors provided on the device of the listener may capture data regarding positions, orientations, velocities or accelerations of the device of the listener along or about one or more axes prior to or while listening to the requested media. Additionally, data regarding applications operating on the device of the listener, or any other information regarding actions or movements of the listener, may be captured or otherwise determined.

For example, the device of the listener may be used to estimate a geographic position of the device or the listener prior to or while listening to the requested media using a GPS sensor, to estimate an acceleration or a velocity of the device or the listener prior to or while listening to the requested media using an accelerometer, or to determine an angular orientation of the device or the listener prior to or while listening to the requested media using a gyroscope. Alternatively, the device of the listener may determine a position, an acceleration, a velocity or an orientation of the listener prior to or while listening to the requested media by aggregating information or data according to one or more sensor fusion algorithms or techniques. The device of the listener may further detect and track accelerations, velocities or positions in x-, y- or z-directions, or along or about x-, y- or z-axes, during the performance of actions or movements over time, and derive net position, velocity, acceleration or orientation data regarding the listener prior to or while listening to requested media according to one or more functions or algorithms.

Also in parallel, at box 930, a pattern of activity of the listener is constructed from the data captured at box 925, which may be processed to determine whether the listener engaged in any discrete actions or movements, or to identify such actions or movements from the data. For example, where the captured data is processed to determine that the listener is stationary prior to or while listening to the requested media, or that the listener is walking, jogging, running, biking, swimming, riding in a vehicle or engaged in any other actions or movements prior to or while listening to the requested media, a scalar, a vector or another representation of a pattern of activity including such actions or movements and times at which such actions or movements are performed may be constructed from such data. Where the captured data indicates that the listener is listening to the requested media via the device while also executing one or more applications or functions on the device, the pattern of activity may also indicate the execution of such applications or functions, and times at which such applications or functions were executed. The pattern of activity may also include identifiers of locations of the device or the listener prior to or while the listener is listening to the requested media, or velocities, accelerations or orientations of the device or the listener prior to or while the listener is listening to the requested media, and times or dates at which the listener listened to the requested media, or any other information, data or metadata.

At box 935, the patterns of activity constructed at box 930 and the attributes of the requested media determined at box 920 are stored in a record of patterns of activity and media for the listener. The record may be maintained on the device of the listener, by a control system responsible for the transmission of media to the device of the listener, or by any other system, e.g., in a "cloud"-based environment.

The process steps described above with respect to box 910, box 915, box 920, box 925 or box 930 may be performed any number of times with respect to media requested by the listener, or media played by the device, and patterns of activity and attributes of the media may be stored in one or more records for any of such instances.

At box 940, whether the listener has requested that his or her activity be monitored for media recommendations is determined. For example, after listening to the requested media, the listener may request to receive notifications when other media by a creator or another source or entity associated with the requested media is available, or when any other kind of media that is similar to the requested media becomes available. The listener may make his or her request in any manner, e.g., by way of an application used by the listener to listen to the requested media by any other application, or in any other manner. If the listener does not request that his or her activity be monitored for media recommendations, then the process ends. In some implementations, a listener may have the opportunity to request that his or her activity be monitored for media recommendations, or to indicate that he or she does not want his or her activity to be monitored for this or any other purpose.

If the listener requests that his or her activity be monitored for media recommendations, however, then the process advances to box 945, where data regarding activity of the listener is again captured by the device or from any other source in the manner described above with respect to box 925, or in any other manner. At box 950, a pattern of activity of the listener is constructed from the captured data in the manner described above with respect to box 930, or in any other manner. The pattern of activity may include, for example, a record of any actions or movements of the listener over time, prior to or while listening to requested media, and may be represented as a scalar, a vector or another form and stored along with any other information, data or metadata.

At box 955, whether the pattern of activity constructed at box 950 matches any of the patterns of activity in the record of patterns of activity and attributes of media for the listener is determined. For example, two or more patterns of activity may be identified as matches where such patterns share one or more actions or movements, e.g., the same activity, such as walking, jogging, running, biking, swimming, riding in a vehicle, or others. As another example, two or more patterns of activity may be identified as matches where such patterns indicate that the listener performed actions or movements at a common time of day, on a common day of the week or month, in a common sequence or at a common location. The pattern of activity constructed at box 950 may be identified as a match with any of the patterns of activity in the record in any manner and on any basis.

If the pattern of activity constructed at box 950 matches any of the patterns of activity in the record, then the process advances to box 960, where media is selected based on the matching patterns of activity. For example, where the listener listens to a first type, category or form of media while engaged in a first pattern of activity, and a second pattern of activity of the listener is identified as matching the first pattern of activity, then a second type, category or form of media may be recommended to the listener when the listener is determined to be engaging in the second pattern of activity. The selected media may feature or relate to the same creator as other media previously listened to by the listener during a matching pattern of activity, or may include any number of media entities that bear any similarity to or relationship with the other media. A degree or an extent of a relationship between selected media and other media previously listened to by the listener during a matching pattern of activity may be determined on any basis, such as an extent to which the patterns of activity match one another, or on any other basis.

At box 965, the selected media is recommended to the listener, e.g., by one or more notifications or other electronic messages provided to the listener, or in any other manner. For example, one or more windows or user interfaces identifying the selected media or including one or more interactive features for causing the selected media to be played may be rendered on the device of the listener.

At box 970, whether the listener requests the selected media in response to the recommendation is determined. If the listener requests the selected media following the recommendation, then the process returns to box 915, where data representing the requested media is transmitted to the device of the listener over the one or more networks, and to box 920, where one or more attributes of the requested media are determined. Alternatively, in some implementations, the media selected at box 960 may be automatically transmitted to the device of the listener, and automatically played by the device of the listener.

If the pattern of activity constructed at box 955 does not match any of the patterns of activity in the record, or if the listener does not request the selected media in response to the recommendation, then the process returns to box 940, where whether the listener has requested that his or her activity be monitored for media recommendations is determined and, if the listener has requested that his or her activity be monitored for media recommendations, to box 945, where data regarding activity of the listener is again captured by the device or from any other source.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form. Where a media program includes video files, alternatively or in addition to audio files, a consumer of the media program may be a viewer or a listener, and the terms "viewer" and "listener" may likewise be used interchangeably herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 4, 6 or 9, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising at least one data store and at least one computer processor, wherein the first computer system is connected to one or more networks, wherein the at least one data store has one or more sets of instructions stored thereon that, when executed by the at least one computer processor, cause the first computer system to perform a method comprising:

transmitting first media content to a second computer system of a listener;

determining at least one of a creator, a genre, a subject, a theme, a title or a topic of the first media content;

receiving first data from the second computer system at a first time;

determining at least one of a first position, a first orientation, a first velocity, a first acceleration or a first application operating on the second computer system at the first time based at least in part on the first data;

identifying a first pattern of activity of the listener based at least in part on:

the first time; and the at least one of the first position, the first orientation, the first velocity, the first acceleration or the first application;

receiving second data from the second computer system at a second time, wherein the second time follows the first time;

determining at least one of a second position, a second orientation, a second velocity, a second acceleration or a second application operating on the second computer system at the second time based at least in part on the second data;

identifying a second pattern of activity of the listener at the second time based at least in part on:

the second time; and the at least one of the second position, the second orientation, the second velocity, the second acceleration or the second application;

determining that the second pattern of activity of the listener is similar to the first pattern of activity of the listener;

selecting second media content, wherein a creator, a genre, a subject, a theme, a title or a topic of the second media content is the creator, the genre, the subject, the theme, the title or the topic of the first media content; and transmitting information regarding the second media content to the second computer system.

2. The first computer system of claim 1, wherein the first media content represents a first episode of a media program, and wherein the second media content represents a second episode of the media program.

3. The first computer system of claim 1, wherein the method further comprises:

establishing a communications channel between the first computer system and the second computer system; and transmitting the second media content to the second computer system.

4. A method comprising:

receiving, by a first computer system, a request for first media content from a second computer system of a listener at a first time;

determining at least a first attribute of the second computer system at or prior to the first time;

identifying, by the first computer system, at least a first action of the listener at or prior to the first time based at least in part on the first attribute;

transmitting, by the first computer system, at least the first media content to the second computer system;

storing, by the first computer system, information associating the first media content and the first action with the first listener in at least one data store;

determining at least a second attribute of the second computer system at or prior to a second time, wherein the second time follows the first time;

identifying, by the first computer system, at least a second action of the listener at or prior to the second time based at least in part on the second attribute;

determining, by the first computer, that the second action is consistent with the first action; and in response to determining that the second action is consistent with the first action, identifying, by the first computer system, second media content based at least in part on the first media content; and transmitting, by the first computer system, information regarding the second media content to the second computer system.

5. The method of claim 4, wherein identifying at least the first action of the listener at or prior to the first time comprises:

determining that the listener executed the first action and a third action at or prior to the first time based at least in part on the first attribute, and wherein determining that the second action is consistent with the first action comprises:

determining that the second action is one of the first action or the third action.

6. The method of claim 4, wherein determining at least the first attribute of the second computer system at or prior to the first time comprises:

determining at least one of a first position, a first orientation, a first velocity, or a first acceleration of the second computer system at the first time, and wherein determining at least the second attribute of the second computer system at or prior to the second time comprises:

determining at least one of a second position, a second orientation, a second velocity, or a second acceleration of the second computer system at the second time.

7. The method of claim 6, wherein determining that the second action is consistent with the first action comprises:

determining that the at least one of the second position, the second orientation, the second velocity or the second acceleration is consistent with the at least one of the first position, the first orientation, the first velocity or the first acceleration.

8. The method of claim 6, wherein the first action is a first one of walking, running or traveling in a vehicle, and wherein the second action is a second one of walking, running or traveling in a vehicle.

9. The method of claim 6, wherein the first action is identified based at least in part on the at least one of the first position, the first orientation, the first velocity or the first acceleration, wherein the second action is identified based at least in part on the at least one of the second position, the second orientation, the second velocity or the second acceleration, and wherein determining that the second action is consistent with the first action comprises:

determining that the second action is the first action.

10. The method of claim 6, further comprising:

generating, by at least the first computer system, a first vector based at least in part on the at least one of the first position, the first orientation, the first velocity or the first acceleration, wherein storing the information associating the first media content and the first action with the first listener comprises:

storing the first vector in association with the first media content and the first listener in the at least one data store, and wherein the method further comprises:

generating, by at least the first computer system, a second vector based at least in part on the at least one of the second position, the second orientation, the second velocity or the second acceleration, wherein determining that the second action is consistent with the first action comprises:

determining that the second vector matches the first vector.

11. The method of claim 4, further comprising:

determining, by the first computer system, at least one of:

a day on which the first media content aired;

a genre of the first media content;

a subject of the first media content;

a tempo of the first media content;

a time at which the first media content aired; or a title of the first media content, and wherein identifying the second media content based at least in part on the first media content comprises:

determining, by the first computer system, at least one of:

that a day on which the second media content aired is consistent with the day on which the first media content aired;

that a genre of the second media content is consistent with the genre of the first media content;

that a subject of the second media content is consistent with the subject of the first media content;

that a tempo of the second media content is consistent with the tempo of the first media content;

that a time on which the second media content aired is consistent with the time on which the first media content aired; or that a title of the second media content is consistent with the title of the first media content.

12. The method of claim 4, wherein the first media content represents a first episode of a media program, and wherein the second media content represents a second episode of the media program.

13. The method of claim 4, further comprising:

identifying, by the first computer system, a creator of at least a portion of the first media content, wherein identifying the second media content based at least in part on the first media content comprises:

determining, by the first computer system, that a creator of at least a portion of the second media content is the creator of at least the portion of the first media content.

14. The method of claim 4, further comprising:

determining, by the first computer system, that the first media content comprises a first media entity; and identifying, by the first computer system, an artist associated with the first media entity, wherein identifying the second media content based at least in part on the first media content comprises:

determining, by the first computer system, that at least a portion of the second media entity relates to the artist associated with the first media entity.

15. The method of claim 4, further comprising:

after transmitting at least the first media content to the second computer system, receiving, by the first computer system from the second computer system, a first request from the listener for an identification of media content based at least in part on at least one action of the listener.

16. The method of claim 4, wherein the second computer system comprises at least one of:

a position sensor;

an accelerometer; or a gyroscope.

17. The method of claim 4, wherein the second computer system is at least a portion of:

an automobile;

a desktop computer;

a laptop computer;

a mobile device;

a smart speaker;

a television; or a wristwatch.

18. A method comprising:

receiving a first request for first media content from a device of a listener at a first time;

receiving first data from the device of the listener at approximately the first time;

in response to the first request, transmitting at least the first media content to the device of the listener;

determining at least one of a first position, a first orientation, a first velocity, a first acceleration or a first application operating on the device of the listener at or prior to the first time based at least in part on the first data;

identifying a first pattern of activity of the listener based at least in part on:

the first time; and the at least one of the first position, the first orientation, the first velocity, the first acceleration or the first application;

receiving a request for a notification of availability of media content similar to the first media content from the device of the listener;

receiving second data from the device of the listener a second time, wherein the second time follows the first time;

determining at least one of a second position, a second orientation, a second velocity, a second acceleration or a second application operating on the second computer system at or prior to the second time based at least in part on the second data;

identifying a second pattern of activity of the listener at the second time based at least in part on:

the second time; and the at least one of the second position, the second orientation, the second velocity, the second acceleration or the second application; and determining that the second pattern of activity of the listener is similar to at least the first pattern of activity of the listener, determining that second media content similar to at least the first media content is available at approximately the second time;

in response to determining that the second media content is available at approximately the second time, transmitting information regarding the second media content to the device of the listener, wherein the information comprises the notification of the availability of the second media content;

receiving a second request for the second media content from the device of the listener; and in response to the second request, causing at least the second media content to be transmitted to the device of the listener.

19. The method of claim 18, wherein the first media content represents a first episode of a media program, wherein the second media content represents a second episode of the media program, and wherein episodes of the media program are available on a non-recurring basis.

20. The method of claim 18, wherein the device of the listener is at least a portion of:

an automobile;

a desktop computer;

a laptop computer;

a mobile device;

a smart speaker;

a television; or a wristwatch, and wherein the device of the listener comprises at least one of:

a position sensor;

an accelerometer; or a gyroscope.

* * * * *